US012612673B2

(12) United States Patent
Kawasaki et al.

(10) Patent No.: US 12,612,673 B2
(45) Date of Patent: *Apr. 28, 2026

(54) CLAD STEEL PLATE, MEMBER, AND PRODUCTION METHODS FOR SAME

(71) Applicant: JFE STEEL CORPORATION, Tokyo (JP)

(72) Inventors: Yoshiyasu Kawasaki, Tokyo (JP); Yuki Toji, Tokyo (JP); Tatsuya Nakagaito, Tokyo (JP); Shinya Yamaguchi, Tokyo (JP); Masayasu Ueno, Tokyo (JP); Katsutoshi Takashima, Tokyo (JP); Tomohiro Ono, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 18/550,459

(22) PCT Filed: Feb. 28, 2022

(86) PCT No.: PCT/JP2022/008473

§ 371 (c)(1),
(2) Date: Sep. 14, 2023

(87) PCT Pub. No.: WO2022/209522

PCT Pub. Date: Oct. 6, 2022

(65) Prior Publication Data

US 2024/0158884 A1 May 16, 2024

(30) Foreign Application Priority Data

Mar. 31, 2021 (JP) ................................. 2021-061930

(51) Int. Cl.

| | |
|---|---|
| *B32B 15/01* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C21D 8/0278* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |

(Continued)

(52) U.S. Cl.

CPC .............. *C21D 9/46* (2013.01); *B32B 15/011* (2013.01); *C21D 6/001* (2013.01); *C21D 6/002* (2013.01); *C21D 6/005* (2013.01); *C21D 6/007* (2013.01); *C21D 6/008*

(2013.01); *C21D 8/02* (2013.01); *C21D 8/0226* (2013.01); *C21D 8/0236* (2013.01); *C21D 8/0257* (2013.01); *C21D 8/0263* (2013.01); *C21D 8/0278* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/24* (2013.01); *C22C 38/38* (2013.01); *C22C 38/60* (2013.01); *C23C 2/06* (2013.01); *C23C 2/285* (2013.01); *C25D 3/22* (2013.01); *C25D 5/50* (2013.01)

(58) Field of Classification Search

None
See application file for complete search history.

(56) References Cited

U.S. PATENT DOCUMENTS

| | | | |
|---|---|---|---|
| 11,274,356 B2 | 3/2022 | Takeda et al. | |
| 2019/0153559 A1 | 5/2019 | Song et al. | |

(Continued)

FOREIGN PATENT DOCUMENTS

| | | |
|---|---|---|
| CN | 109415790 A | 3/2019 |
| CN | 111902554 A | 11/2020 |

(Continued)

OTHER PUBLICATIONS

Machine translation of DE 102017218434 A1 via EPO, translated Mar. 13, 2025 (Year: 2017).*

(Continued)

*Primary Examiner* — Elizabeth Collister
(74) *Attorney, Agent, or Firm* — KENJA IP LAW PC

(57) ABSTRACT

A clad steel plate having tensile strength (TS) of 780 MPa or more, excellent ductility, bendability, collision resistance, and LME resistance. The clad steel plate having a base metal and a cladding metal on front and back surfaces of the base metal, and the chemical composition and microstructure of the base metal and the cladding metal being appropriately controlled so that the average Vickers hardness (HVL) of the cladding metal is 260 or less, the average Vickers hardness (HVL) of the cladding metal divided by the average Vickers hardness (HVB) of the base metal is 0.80 or less, the boundary roughness between the base metal and the cladding metal is 50 μm or less at the maximum height Ry, and the number of voids at the boundary between the base metal and the cladding metal is controlled to 20 or fewer per 10 mm length of the boundary.

20 Claims, No Drawings

(51) Int. Cl.

| | | |
|---|---|---|
| *C22C 38/12* | (2006.01) | |
| *C22C 38/14* | (2006.01) | |
| *C22C 38/16* | (2006.01) | |
| *C22C 38/24* | (2006.01) | |
| *C22C 38/38* | (2006.01) | |
| *C22C 38/60* | (2006.01) | |
| *C23C 2/06* | (2006.01) | |
| *C23C 2/28* | (2006.01) | |
| *C25D 3/22* | (2006.01) | |
| *C25D 5/50* | (2006.01) | |

(56) References Cited

U.S. PATENT DOCUMENTS

| | | |
|---|---|---|
| 2019/0389178 A1 | 12/2019 | Becker et al. |
| 2020/0010919 A1 | 1/2020 | Suzuki et al. |
| 2020/0061971 A1 | 2/2020 | Wolske et al. |
| 2020/0232060 A1 | 7/2020 | Nakano et al. |
| 2020/0346436 A1 | 11/2020 | Becker et al. |
| 2021/0017620 A1 | 1/2021 | Yokoyama et al. |
| 2024/0158884 A1 | 5/2024 | Kawasaki et al. |

FOREIGN PATENT DOCUMENTS

| | | | |
|---|---|---|---|
| DE | 102017218434 A1 | 4/2019 | |
| JP | 2005297013 A | 10/2005 | |
| JP | 4654594 B2 | 3/2011 | |
| JP | 6388099 B1 | 9/2018 | |
| JP | 2019524986 A | 9/2019 | |
| JP | 2020509223 A | 3/2020 | |
| JP | 2020519765 A | 7/2020 | |
| WO | 2018151322 A1 | 8/2018 | |
| WO | 2018151331 A1 | 8/2018 | |
| WO | 2019076717 A1 | 4/2019 | |
| WO | 2020244915 A1 | 12/2020 | |

OTHER PUBLICATIONS

Machine translation of JP 4654594B2 via EPO, translated Mar. 13, 2025 (Year: 2011).*

Dec. 9, 2024, the Extended European Search Report issued by the European Patent Office in the corresponding European Patent Application No. 22779747.9.

May 17, 2022, International Search Report issued in the International Patent Application No. PCT/JP2022/008473.

Oct. 1, 2025, Office Action issued by the China National Intellectual Property Administration in the corresponding Chinese Patent Application No. 202280023316.5 with English language concise statement of relevance.

May 9, 2025, Office Action issued by the China National Intellectual Property Administration in the corresponding Chinese Patent Application No. 202280023316.5 with English language search report.

* cited by examiner

CLAD STEEL PLATE, MEMBER, AND PRODUCTION METHODS FOR SAME

TECHNICAL FIELD

The present disclosure relates to a clad steel plate, a member, and production methods for same. In particular, a clad steel plate and a member having tensile strength (TS) of 780 MPa or more, excellent ductility, bendability, collision resistance, and liquid metal embrittlement (LME) resistance, and production methods for same. The clad steel plate of the present disclosure is suitable as a framework part of an automotive body, in particular as an impact energy absorbing member.

BACKGROUND

In recent years, enhancement of fuel efficiency of automobiles has become an important issue from the viewpoint of protecting the global environment. Consequently, there is a growing trend of sheet metal thinning of automotive body material through increases in strength of automotive body material, thereby reducing the weight of an automotive body itself. On the other hand, social demand for improved crashworthiness of automobiles is also becoming higher, and it is desirable to develop steel sheets and members that not only have higher strength but also superior collision resistance in the event of a collision while driving. Further, from the viewpoint of workability, in addition to collision resistance, it is desirable to develop steel sheets that have excellent ductility.

As such a high-strength steel sheet, for example, JP6388099 B (PTL 1) describes a hot-dip galvanized steel sheet and a galvannealed steel sheet, a single steel sheet having, from a surface of a base metal to a depth of 5.0 μm or more, an internal oxidation layer in which at least one part of a crystal grain boundary is covered with oxides, and wherein: in a region from the surface of the base metal to a depth of 5.0 μm, a grain boundary coverage ratio of the oxides is 60% or more, the steel sheet further having a decarburization layer from the surface of the base metal to a depth of 50 μm or more, the steel sheet having a tensile strength of 980 MPa or more and excellent liquid metal embrittlement resistance.

JP2020-519765 A (PTL 2) describes a hot forming material made of a three-layer composite, comprising a core layer made of a hardening steel having a tensile strength >1,900 MPa and/or a hardness >575 HV10 in the press-hardened state of the hot forming material, and two cover layers integrally connected to the core layer and made of a steel that is weaker compared to the core layer and which has a tensile strength >750 MPa and/or hardness >235 HV10.

JP2020-509223 A (PTL 3) describes a steel material composite, comprising a core layer of a higher strength or high strength steel and, integrally bonded to the core layer on one or both sides, an outer layer of ferritic, chemically resistant steel, wherein the ferritic, chemically resistant steel contains ≤0.07% by weight of carbon, ≤1% by weight of manganese, 12% to 30% by weight of chromium, ≤7% by weight of molybdenum, ≤0.05% by weight of each of phosphorus and sulfur, ≤0.5% by weight of aluminum, ≤0.5% by weight of silicon, and ≤1% by weight of each of titanium, niobium, vanadium, and zirconium, with titanium, niobium, vanadium, and zirconium in total making up a proportion of >0.1% by weight, and the remainder being iron and inevitable impurity.

JP2019-524986 A (PTL 4) describes a clad steel plate having excellent strength and formability, comprising a base metal and a clad material provided on both sides of the base metal, wherein the base metal is an austenitic high-manganese steel consisting of C: 0.3 wt. % to 1.4 wt. %, Mn: 12 wt. % to 25 wt. %, the remainder being Fe and inevitable impurity, the clad material being a martensitic carbon steel consisting of C: 0.09 wt. % to 0.4 wt. %, Mn: 0.3 wt. % to 4.5 wt. %, the remainder being Fe and inevitable impurity.

CITATION LIST

Patent Literature

PTL 1: JP6388099 B
PTL 2: JP2020-519765 A (publication in Japan of WO2018210415 A1)
PTL 3: JP2020-509223 A (publication in Japan of WO2018137781 A1)
PTL 4: JP2019-524986 A (publication in Japan of WO2017222342 A1)

SUMMARY

Technical Problem

Impact energy absorbing members of automobiles, such as front side members and rear side members, are limited to steel sheets having a tensile strength (hereinafter also referred to as TS) from 590 MPa grade to 780 MPa grade. This is because, as strength increases, cracks become more likely to occur in bending crush test and axial crush tests that simulate crash tests, and impact energy is not sufficiently absorbed.

Further, in recent years, when spot-welding high-strength hot-dip galvanized steel sheets and high-strength galvannealed steel sheets, or when spot-welding high-strength cold-rolled steel sheets and galvanized steel sheets during assembly of automotive bodies and parts, liquid metal embrittlement cracking (LMEC, hereinafter also referred to as LME cracking) has been observed to occur in welded portions. LME cracking occurs when the zinc in the galvanized layer melts during spot welding, causing molten zinc to penetrate a crystal grain boundary of the steel microstructure at the welded portion, and stress caused when welding electrode pressure is released acts to cause cracking. Even a high-strength cold-rolled steel sheet that is not galvanized may experience LME cracking when spot welded to a galvanized steel sheet, due to contact of molten zinc from the galvanized steel sheet with the high-strength cold-rolled steel sheet. High-strength steel sheets having a TS of 780 MPa or more contain high amounts of C, Si, and Mn, and therefore there is concern about the risk of LME cracking.

However, in PTL 1, the steel sheet is a single sheet, and further, bending and collision resistance were not studied.

In PTL 2, the material is hot forming material (clad steel plate for hot pressing), not clad steel plate for cold pressing. Further, although properties of individual layers vary little and have high strength and ductility in a region near the surface, LME resistance was not studied.

In PTL 3, although ductility, low susceptibility to hydrogen-induced cracking, and favorable corrosion resistance are properties of the composite, bendability, collision resistance, and LME resistance were not studied.

In PTL 4, the base metal has a high alloy component, and further, bendability, collision resistance, and LME resistance were not studied.

Thus, a steel sheet capable of comprehensively satisfying tensile strength (TS), ductility bendability, collision resistance, and LME resistance requirements has not yet been developed, and the development of such a steel sheet is still desirable.

The present disclosure was developed in view of the situation described above, and it would be helpful to provide a clad steel plate having tensile strength (TS) of 780 MPa or more, excellent ductility, bendability, collision resistance, and LME resistance, and an advantageous method of producing same.

It would also be helpful to provide a member made from the clad steel plate and a method of producing same.

Solution to Problem

As a result of intensive studies, the inventors made the following findings.

That is, the inventors found that a clad steel plate having tensile strength (TS) of 780 MPa or more, and excellent ductility, bendability, collision resistance, and LME resistance may be obtained by:

(a) a clad steel plate having a base metal and a cladding metal on the front and back surfaces of the base metal, instead of a single steel sheet;

(b) appropriate control of the composition and microstructure of the base metal and cladding metal;

(c) adjusting the average Vickers hardness (HVL) of the cladding metal to 260 or less, and adjusting the value obtained by dividing the average Vickers hardness (HVL) of the cladding metal by the average Vickers hardness (HVB) of the base metal to 0.80 or less;

(d) boundary roughness between the base metal and the cladding metal being 50 μm or less at the maximum height Ry; and (e) controlling the number of voids at the boundary between the base metal and cladding metal to 20 or fewer per 10 mm of boundary length.

The present disclosure is based on these discoveries and further studies. Primary features of the present disclosure are as follows.

1. a clad steel plate having a base metal and a cladding metal on front and back surfaces of the base metal, the base metal comprising a chemical composition containing (consisting of), by mass %, C: 0.080% or more and 0.350% or less,
Si: 0.50% or more and 2.00% or less,
Mn: 1.80% or more and less than 3.50%,
P: 0.001% or more and 0.100% or less,
S: 0.0200% or less,
Al: 0.010% or more and 2.000% or less, and
N: 0.0100% or less,
with the balance being Fe and inevitable impurity; the steel microstructure comprising:
a total area ratio of bainite and tempered martensite: 30% or more, and
a volume fraction of retained austenite: more than 5%,
the cladding metal comprising a chemical composition containing (consisting of), by mass %,
C: 0.100% or less,
Si: 0.60% or less,
Mn: 0.05% or more and 2.50% or less
P: 0.001% or more and 0.100% or less,
S: 0.0200% or less, Al: 0.010% or more and 0.100% or less, and
N: 0.0100% or less,
with the balance being Fe and inevitable impurity; the steel microstructure comprising:
an area ratio of ferrite: 80% or more, wherein
average Vickers hardness (HVL) of the cladding metal is 260 or less,
the average Vickers hardness (HVL) of the cladding metal divided by average Vickers hardness (HVB) of the base metal is 0.80 or less,
boundary roughness between the base metal and the cladding metal is 50 μm or less at a maximum height Ry; and
a number of voids at a boundary between the base metal and the cladding metal is 20 or fewer per 10 mm of boundary length.

2. The clad steel plate of aspect 1, wherein at least one of the chemical composition of the base metal and the chemical composition of the cladding metal further contains, by mass % at least one selected from the group consisting of:

Sb: 0.200% or less,
Sn: 0.200% or less,
Ti: 0.200% or less,
Nb: 0.200% or less,
V: 0.100% or less,
B: 0.0100% or less,
Cu: 1.00% or less,
Cr: 1.000% or less,
Ni: 1.000% or less,
Mo: 0.50% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less.

3. The clad steel plate of aspect 1 or 2, wherein thickness of the base metal divided by total thickness of the cladding metal is 1 or more.

4. The clad steel plate of any one of aspects 1 to 3, having a galvanized layer, a galvannealed layer, or an electrogalvanized layer on a surface.

5. The clad steel plate of any one of aspects 1 to 4, wherein a total diffusible hydrogen content in the base metal and the cladding metal is 0.50 mass ppm or less.

6. A member made using the clad steel plate of any one of aspects 1 to 5.

7. A method of producing a clad steel plate, comprising:
a first preparation process of preparing a base metal steel slab comprising the chemical composition of the base metal of aspect 1 or 2;
a second preparation process of preparing cladding metal steel slabs each comprising the chemical composition of the cladding metal of aspect 1 or 2;

a surface treatment process of surface treating both front and back surfaces of the base metal steel slab and at least one of front and back surfaces of each of the cladding metal steel slabs to have a surface roughness Ra of 30 μm or less;

a stacking process of stacking the base metal steel slab and the cladding metal steel slabs in the order of one the cladding metal steel slabs—the base metal steel slab— one of the cladding metal steel slabs so that the surface treated surfaces of the base metal steel slab and the surface treated surfaces of the cladding metal steel slabs are in contact, to obtain a stacked slab;

a joining process of joining the cladding metal steel slabs and the base metal steel slab, and creating a vacuum of $1 \times 10^{-2}$ Torr or less between the cladding metal steel slabs and the base metal steel slab to obtain a joined stacked slab;

a hot rolling process of heating the joined stacked slab to a temperature range from 1,050° C. or more to 1,350° C. or less, then hot rolling under a set of conditions including a rolling finish temperature of 820° C. or more to obtain a hot-rolled steel sheet;

a cold rolling process of cold rolling the hot-rolled steel sheet under a set of conditions including a cold rolling reduction ratio of 30% or more to 80% or less to obtain a cold-rolled steel sheet; and an annealing process of annealing the cold-rolled steel sheet under a set of conditions including an annealing temperature of 750° C. or more and 950° C. or less and a holding time of 20 s or more.

8. The method of producing a clad steel plate of aspect 7, further comprising a first reheating process after the annealing process, of cooling the cold-rolled steel sheet to a cooling stop temperature of 250° C. or less, then reheating to a temperature range from more than 250° C. to 450° C. or less and holding for 10 s or more.

9. The method of producing a clad steel plate of aspect 7 or 8, further comprising a coating or plating process after the annealing process or after the first reheating process, of subjecting the cold-rolled steel sheet to a coating or plating treatment to obtain a coated or plated steel sheet.

10. The method of producing a clad steel plate of aspect 9, wherein the coating or plating treatment is a hot-dip galvanizing treatment, a galvannealing treatment, or an electrogalvanization treatment.

11. The method of producing a clad steel plate of aspect 9 or 10, further comprising a dehydrogenation treatment process after the coating or plating treatment, of holding the coated or plated steel sheet at a temperature range from 50° C. or more to 300° C. or less for 0.5 h or more and 72.0 h or less.

12. The method of producing a clad steel plate of aspect 7, further comprising:

a coating process after the annealing process, of subjecting the cold-rolled steel sheet to a hot-dip galvanizing treatment or a galvannealing treatment to obtain a coated steel sheet; and a second reheating process of cooling the coated steel sheet to a cooling stop temperature of 250° C. or less, then reheating to a temperature range from more than 250° C. to 450° C. or less and holding for 10 s or more.

13. The method of producing a clad steel plate of aspect 12, further comprising a dehydrogenation treatment process after the second reheating process, of holding the coated steel sheet at a temperature range from 50° C. or more to 300° C. or less for 0.5 h or more and 72.0 h or less.

14. A method of producing a member, wherein the clad steel plate of any one of aspects 1 to 5 is subjected to at least one of a forming process and a joining process to make the member.

Advantageous Effect

The present disclosure provides the clad steel plate and the member each having tensile strength (TS) of 780 MPa or more, excellent ductility, bendability, collision resistance, and LME resistance, and production methods for same.

DETAILED DESCRIPTION

The following describes embodiments of the present disclosure.

[1] Clad Steel Plate

[1-1] Chemical Composition of Base Metal

First, a chemical composition of the base metal of the clad steel plate according to an embodiment of the present disclosure is described. Hereinafter, although the unit in all chemical compositions is "mass %", this may be indicated simply as "%", unless otherwise specified.

C: 0.080% or more and 0.350% or less

C is an element effective for securing a TS of 780 MPa or more by generating a desired amount of martensite, tempered martensite and retained austenite. When C content is less than 0.080%, an area ratio of ferrite increases, making achieving a TS of 780 MPa or more difficult. On the other hand, when the C content exceeds 0.350%, the volume fraction of retained austenite increases excessively and the hardness of martensite formed from the retained austenite during bending deformation increases greatly. This results in reduced bendability and collision resistance. Therefore, the C content is 0.080% or more and 0.350% or less. The C content is preferably 0.090% or more. The C content is more preferably 0.100% or more. The C content is preferably 0.330% or less. The C content is more preferably 0.320% or less.

Si: 0.50% or more and 2.00% or less

Si is an element effective for securing a TS of 780 MPa or more by solid solution strengthening. When Si content is less than 0.50%, achieving a TS of 780 MPa or more becomes difficult. On the other hand, when the Si content exceeds 2.00%, scale formation of the base metal steel slab increases and surface roughness Ra of the base metal steel slab becomes larger. Further, the maximum height Ry of boundary roughness between the base metal and the cladding metal increases and the number of voids at the boundary between the base metal and the cladding metal in the final material increases, and bendability and collision resistance decrease. Therefore, the Si content is 0.50% or more and 2.00% or less. The Si content is preferably 0.60% or more. The Si content is more preferably 0.70% or more. The Si content is preferably 1.80% or less. The Si content is more preferably 1.60% or less.

Mn: 1.80% or more and less than 3.50%

Mn is an important element that regulates area ratios of martensite, tempered martensite, and retained austenite. When Mn content is less than 1.80%, an area ratio of ferrite increases, making achieving a TS of 780 MPa or more difficult. On the other hand, when the Mn content is 3.50% or more, the volume fraction of retained austenite increases excessively and the hardness of martensite formed from the retained austenite during bending deformation increases greatly. This results in reduced bendability and collision resistance. Therefore, the Mn content is 1.80% or more and less than 3.50%. The Mn content is preferably 2.00% or more. The Mn content is more preferably 2.20% or more. The Mn content is preferably 3.30% or less. The Mn content is more preferably 3.20% or less.

P: 0.001% or more and 0.100% or less

P is an element that acts as a solid solution strengthener and may increase steel sheet strength. To achieve these effects, P content is 0.001% or more. On the other hand, when the P content exceeds 0.100%, P segregates to a prior austenite grain boundary and embrittles the grain boundary. As a result, the number of voids generated during bending deformation increases, and bendability and collision resistance decrease. Therefore, the P content is 0.001% or more and 0.100% or less. The P content is more preferably 0.030% or less.

S: 0.0200% or less

S exists as sulfide in steel, and content exceeding 0.0200% potentially reduces the ultimate deformability of a steel sheet. As a result, the number of voids generated during bending deformation increases, and bendability and collision resistance decrease. Therefore, S content is 0.0200% or less. The S content is preferably 0.0080% or less. Although the lower limit of the S content is not particularly specified, the S content is commonly 0.0001% or more in view of production technology constraints.

Al: 0.010% or more and 2.000% or less

Al is an effective deoxidizer. To obtain the effect of Al addition, Al content is 0.010% or more. On the other hand, when the Al content exceeds 2.000%, the area ratio of ferrite increases, making achieving a TS of 780 MPa or more difficult. Therefore, the Al content is 0.010% or more and 2.000% or less.

N: 0.0100% or less

N exists as nitride in steel, and content exceeding 0.0100% reduces the ultimate deformability of a steel sheet. As a result, the number of voids generated during bending deformation increases, and bendability and collision resistance decrease. Therefore, the N content is 0.0100% or less. The N content is preferably 0.0050% or less. Although the lower limit of the N content is not particularly specified, the N content is commonly 0.0005% or more in view of production technology constraints.

Basic composition of the base metal of the clad steel plate according to an embodiment of the present disclosure is described above. The base metal of the clad steel plate according to an embodiment of the present disclosure has a chemical composition including the basic composition above, with the balance being Fe (iron) and inevitable impurity. Here, the base metal of the clad steel plate according to an embodiment of the present disclosure preferably has a chemical composition consisting of the basic composition above, with the balance being Fe and inevitable impurity. In addition to the above basic composition, the base metal of the clad steel plate according to an embodiment of the present disclosure may contain at least one of the components selected from the group listed below. The components listed below do not have a lower limit because the defined effect is obtainable whenever content is equal to or less than the upper limit indicated below. When any of the following optional elements are included below an appropriate lower limit described below, such an element is included as an inevitable impurity.

Sb: 0.200% or less

Sb is an element effective for suppressing diffusion of C in the vicinity of the steel sheet surface during annealing and for controlling the formation of a decarburized layer in the vicinity of the steel sheet surface. When Sb content exceeds 0.200%, a soft layer is not formed in the vicinity of the steel sheet surface, which may lead to a decrease in bendability and collision resistance. Therefore, the Sb content is preferably 0.200% or less. The Sb content is more preferably 0.020% or less. On the other hand, from the viewpoint of keeping TS within a more suitable range, the Sb content is preferably 0.002% or more. The Sb content is more preferably 0.005% or more.

Sn: 0.200% or less

Sn is an element effective for suppressing diffusion of C in the vicinity of the steel sheet surface during annealing and for controlling the formation of a decarburized layer in the vicinity of the steel sheet surface. When Sn content exceeds 0.200%, a soft layer is not formed on the steel sheet surface, which may lead to a decrease in bendability and collision resistance. Therefore, the Sn content is preferably 0.200% or less. The Sn content is more preferably 0.020% or less. On the other hand, from the viewpoint of keeping TS within a more suitable range, the Sn content is preferably 0.002% or more. The Sn content is more preferably 0.005% or more.

Ti: 0.200% or less, Nb: 0.200% or less, V: 0.100% or less

Ti, Nb, and V cause TS to increase due to formation of fine carbides, nitrides, and carbonitrides during hot rolling and annealing. When at least one of Ti, Nb, and V is added, the content of each of Ti, Nb, and V included is preferably 0.001% or more to achieve this effect. The content of each is more preferably 0.005% or more. On the other hand, when the Ti content exceeds 0.200%, the Nb content exceeds 0.200%, or the V content exceeds 0.100%, large amounts of coarse precipitates and inclusions may be formed. In such cases, the presence of diffusible hydrogen in the steel sheet may cause coarse precipitates and inclusions to become the initiation points for cracks during bending deformation, resulting in reduced bendability and collision resistance. Therefore, when at least one of Ti, Nb, and V is added, the Ti content is preferably 0.200% or less, the Nb content is preferably 0.200% or less, and the V content is preferably 0.100% or less. The content of each of Ti, Nb, and V is respectively preferably 0.060% or less.

B: 0.0100% or less

B is an element that may improve hardenability by segregating to austenite grain boundaries, and the addition of B to steel may suppress ferrite formation and grain growth during annealing and cooling. To obtain this effect, B content is preferably 0.0001% or more. The B content is more preferably 0.0002% or more. On the other hand, when the B content exceeds 0.0100%, cracking may occur inside a steel sheet during hot rolling, which may reduce the ultimate deformability of the steel sheet. As a result, the number of voids generated during bending deformation may increase, resulting in reduced bendability and collision resistance. Therefore, when B is added, the B content is preferably 0.0100% or less. The B content is more preferably 0.0050% or less.

Cu: 1.00% or less

Cu is an element that increases hardenability and is effective in bringing an area ratio of a hard phase within a more suitable range to bring TS within a more suitable range. To obtain this effect, Cu content is preferably 0.005% or more. The Cu content is more preferably 0.02% or more. On the other hand, when the Cu content exceeds 1.00%, the area ratio of the hard phase increases and TS becomes excessively high. Further, coarse precipitates and inclusions increase, and when diffusible hydrogen is included in a steel sheet, the precipitates and inclusions may become initiation points for cracks during bending deformation, resulting in reduced bendability and collision resistance. Therefore, when Cu is added, the Cu content is preferably 1.00% or less. The Cu content is more preferably 0.20% or less.

Cr: 1.000% or less

Cr is an element that improves hardenability and is effective in generating a hard phase. When Cr content exceeds 1.000%, an area ratio of hard martensite may increase, resulting in reduced bendability and collision resistance. Therefore, when Cr is added, the Cr content is preferably 1.000% or less. The Cr content is more preferably 0.250% or less. The Cr content is even more preferably 0.100% or less. The Cr content may be 0.0000%, but from the viewpoint of increasing hardenability and bringing TS within a more suitable range, the Cr content is preferably 0.010% or more.

Ni: 1.000% or less

Ni is an element that increases hardenability and is effective in bringing an area ratio of a hard phase within a more suitable range to bring TS within a more suitable range. To obtain this effect, Ni content is preferably 0.005% or more. The Ni content is more preferably 0.020% or more. On the other hand, when the Ni content exceeds 1.000%, coarse precipitates and inclusions may increase. In such cases, the presence of diffusible hydrogen in the steel sheet may cause the precipitates and inclusions to become the initiation points for cracks during bending deformation, resulting in reduced bendability and collision resistance. Therefore, when Ni is added, the Ni content is preferably 1.000% or less. The Ni content is more preferably 0.800% or less.

Mo: 0.50% or less

Mo is an element that improves hardenability and is effective in generating a hard phase. When the Mo content exceeds 0.50%, an area ratio of hard martensite may increase, resulting in reduced bendability and collision resistance. Therefore, when Mo is added, the Mo content is preferably 0.50% or less. The Mo content is more preferably 0.45% or less. The Mo content is even more preferably 0.40% or less. The Mo content is preferably 0.01% or more from the viewpoint of increasing hardenability and bringing TS within a more suitable range. The Mo content is more preferably 0.03% or more.

Ta: 0.100% or less

Ta, like Ti, Nb, and V, causes TS to increase due to formation of fine carbides, nitrides, and carbonitrides during hot rolling and annealing. In addition, Ta has the effect of partially dissolving into Nb carbides and Nb carbonitrides, forming composite precipitates such as (Nb, Ta) (C, N), significantly suppressing precipitate coarsening and stabilizing strengthening by precipitation, thereby improving the TS of steel sheets. To achieve this effect, Ta content is preferably 0.001% or more. On the other hand, when the Ta content exceeds 0.100%, a large amount of coarse precipitates and inclusions may be formed. In such cases, the presence of diffusible hydrogen in the steel sheet may cause the precipitates and inclusions to become the initiation points for cracks during bending deformation, resulting in reduced bendability and collision resistance. Therefore, when Ta is added, the Ta content is preferably 0.100% or less.

W: 0.500% or less

W is an effective element for securing strength. When the W content exceeds 0.500%, an area ratio of hard martensite may increase, resulting in reduced bendability and collision resistance. Therefore, when W is added, the W content is preferably 0.500% or less. The W content is more preferably 0.450% or less. The W content is even more preferably 0.400% or less. From the viewpoint of increasing hardenability and bringing TS within a more suitable range, the W content is preferably 0.001% or more. The W content is more preferably 0.030% or more.

Mg: 0.0200% or less

Mg is an element effective for sphericalizing the shape of inclusions such as sulfides and oxides to improve steel sheet ultimate deformability, bendability, and collision resistance. To obtain this effect, Mg content is preferably 0.0001% or more. On the other hand, when the Mg content exceeds 0.0200%, a large amount of coarse precipitates and inclusions may be formed. In such cases, the presence of diffusible hydrogen in the steel sheet may cause the precipitates and inclusions to become the initiation points for cracks during bending deformation, resulting in reduced bendability and collision resistance. Therefore, when Mg is added, the Mg content is preferably 0.0200% or less.

Zn: 0.020% or less, Co: 0.020% or less, Zr: 0.020% or less

Zn, Co, and Zr are all elements effective for sphericalizing the shape of inclusions to improve steel sheet ultimate deformability, bendability, and collision resistance. To achieve this effect, content of each of Zn, Co, and Zr is preferably 0.001% or more. On the other hand, when the content of any one of Zn, Co, and Zr exceeds 0.020%, a large amount of coarse precipitates and inclusions may be formed. In such cases, the presence of diffusible hydrogen in the steel sheet may cause the precipitates and inclusions to become the initiation points for cracks during bending deformation, resulting in reduced bendability and collision resistance. Therefore, when one or more of Zn, Co, and Zr are added, the content of each is preferably 0.020% or less.

Ca: 0.0200% or less

Ca is present in steel as inclusions. When the Ca content exceeds 0.0200%, the presence of diffusible hydrogen in a steel sheet may cause the inclusions to become the initiation points for cracks during bending deformation, resulting in reduced bendability and collision resistance. Therefore, when Ca is added, the Ca content is preferably 0.0200% or less. The Ca content is more preferably 0.0020% or less. The lower limit of Ca content may be 0.0000%, but the Ca content is preferably 0.0001% or more in view of production technology constraints.

Ce: 0.0200% or less, Se: 0.0200% or less, Te: 0.0200% or less, Ge: 0.0200% or less, As: 0.0200% or less, Sr: 0.0200% or less, Cs: 0.0200% or less, Hf: 0.0200% or less, Pb: 0.0200% or less, Bi: 0.0200% or less, and REM: 0.0200% or less Ce, Se, Te, Ge, As, Sr, Cs, Hf, Pb, Bi, and REM are elements effective for improving steel sheet ultimate deformability, bendability, and collision resistance. To achieve this effect, content of each of Ce, Se, Te, Ge, As, Sr, Cs, Hf, Pb, Bi, and REM is preferably 0.0001% or more. On the other hand, when the content of any one of Ce, Se, Te, Ge, As, Sr, Cs, Hf, Pb, Bi, and REM exceeds 0.0200%, a large amount of coarse precipitates and inclusions may form. In such cases, the presence of diffusible hydrogen in the steel sheet may cause the precipitates and inclusions to become the initiation points for cracks during bending deformation, resulting in reduced bendability and collision resistance. Therefore, when any one of Ce, Se, Te, Ge, As, Sr, Cs, Hf, Pb, Bi, and REM is added, the content thereof is preferably 0.0200% or less.

[1-2] Chemical Composition of Cladding Metal

Next, a chemical composition of the cladding metal of the clad steel plate according to an embodiment of the present disclosure is described. Hereinafter, although the unit in all chemical compositions is "mass %", this may be indicated simply as "%", unless otherwise specified.

C: 0.100% or less

C decreases LME resistance. C also reduces bendability and collision resistance through the formation of martensite and retained austenite. Therefore, as little C as possible is preferred. When the C content exceeds 0.100%, martensite and retained austenite increase excessively, resulting in reduced bendability and collision resistance. Therefore, the C content is 0.100% or less. The C content is preferably 0.090% or less. The C content is more preferably 0.070% or less. Although the lower limit of C content is not particularly specified, the C content is commonly 0.001% or more in view of production technology constraints.

Si: 0.60% or less

Si reduces LME resistance and also inhibits galvanizability, and therefore as little as possible is preferred. Si content exceeding 0.60% decreases LME resistance and galvanizability. Therefore, the Si content is 0.60% or less. The Si content is preferably 0.40% or less. The Si content is more preferably 0.30% or less. Although the lower limit of Si content is not particularly specified, the Si content is commonly 0.01% or more in view of production technology constraints.

Mn: 0.05% or more and 2.50% or less

Mn is an important element that regulates area ratios of martensite, tempered martensite, and retained austenite. When Mn content is less than 0.05%, an area ratio of ferrite increases, making achieving a TS of 780 MPa or more difficult. On the other hand, when the Mn content exceeds 2.50%, the volume fraction of retained austenite increases excessively and the hardness of martensite formed from the retained austenite during bending deformation increases greatly. This results in reduced bendability and collision resistance. The effect is particularly noticeable in cladding metal of a clad steel plate having high strength. Therefore, the Mn content is 0.05% or more and 2.50% or less. The Mn content is preferably 0.15% or more. The Mn content is more preferably 0.20% or more. The Mn content is preferably 2.30% or less. The Mn content is more preferably 2.20% or less.

P: 0.001% or more and 0.100% or less

P is an element that acts as a solid solution strengthener and may increase steel sheet strength. To achieve these effects, P content is 0.001% or more. On the other hand, when the P content exceeds 0.100%, galvanizability and surface appearance are degraded. Therefore, the P content is 0.001% or more and 0.100% or less. The P content is more preferably 0.030% or less.

S: 0.0200% or less

When the S content exceeds 0.0200%, a large amount of solute S segregates to austenite grain boundaries, causing surface cracking during hot rolling. Further, a large amount of S segregates at scale boundaries and worsens scale separability. Therefore, S content is 0.0200% or less. The S content is preferably 0.0080% or less. Although the lower limit of the S content is not particularly specified, the S content is commonly 0.0001% or more in view of production technology constraints.

Al: 0.010% or more and 0.100% or less

Al is an effective deoxidizer. To obtain the effect of Al addition, Al content is 0.010% or more. On the other hand, when the Al content exceeds 0.100%, many non-recrystallized grains remain due to the pinning effect of nitrides, and surface defects are likely to occur. Therefore, the Al content is 0.010% or more and 0.100% or less.

N: 0.0100% or less

N exists as nitrides in steel, and when the content exceeds 0.0100%, many non-recrystallized grains remain due to the pinning effect of nitrides, and surface defects are likely to occur. Therefore, the N content is 0.0100% or less. The N content is more preferably 0.0050% or less. Although the lower limit of the N content is not particularly specified, the N content is commonly 0.0005% or more in view of production technology constraints.

Basic composition of the cladding metal of the clad steel plate according to an embodiment of the present disclosure is described above. The cladding metal of the clad steel plate according to an embodiment of the present disclosure has a chemical composition including the basic composition above, with the balance being Fe (iron) and inevitable impurity. Here, the cladding metal of the clad steel plate according to an embodiment of the present disclosure preferably has a chemical composition consisting of the basic composition above, with the balance being Fe and inevitable impurity. In addition to the above basic composition, the cladding metal of the clad steel plate according to an embodiment of the present disclosure may contain at least one of the components selected from the group listed below. The components listed below do not have a lower limit because the defined effect is obtainable whenever content is equal to or less than the upper limit indicated below. When any of the following optional elements are included below an appropriate lower limit described below, such an element is included as an inevitable impurity.

Sb: 0.200% or less,
Sn: 0.200% or less,
Ti: 0.200% or less,
Nb: 0.200% or less,
V: 0.100% or less,
B: 0.0100% or less,
Cu: 1.00% or less,
Cr: 1.000% or less,
Ni: 1.000% or less,
Mo: 0.50% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less.

The reasons for the limitations pertaining to the above optionally added components are basically the same as those for the optionally added components of the base metal of the clad steel plate according to an embodiment of the present disclosure, and are therefore not repeated here.

13

[1-3] Steel Microstructure of the Base Metal

Next, the steel microstructure of the base metal of the clad steel plate according to an embodiment of the present disclosure is described.

The steel microstructure of the base metal of the clad steel plate according to an embodiment of the present disclosure has a microstructure wherein:

% a total area ratio of bainite and tempered martensite: 30% or more, and a volume fraction of retained austenite: more than 5%.

Total area ratio of bainite and tempered martensite: 30% or more

To secure a TS of 780 MPa or more, the total area ratio of bainite and tempered martensite needs to be 30% or more. The total area ratio of bainite and tempered martensite is preferably 35% or more. The upper limit of the total area ratio of bainite and tempered martensite is not particularly limited and may be 100%. The total area ratio of bainite and tempered martensite is preferably 92% or less.

The area ratio of either bainite or tempered martensite may be 0%, as long as the total area ratio of bainite and tempered martensite is 30% or more.

Here, the area ratios of bainite and tempered martensite are measured as follows. The area ratios are measured at a position at ¼ of the thickness of the base metal.

That is, a sample is cut such that an observation plane is a thickness cross-section parallel to the rolling direction of the clad steel plate. The observed plane is then mirror-polished using diamond paste, followed by finish polishing using colloidal silica, and then etching with 3 vol. % nital to reveal the microstructure. Then, three views of a 17 μm×23 μm field of view of the observation plane of the sample are observed using a scanning electron microscope (SEM) at an accelerating voltage of 15 kV and a magnification of 5000 times. In the obtained microstructure image, the area ratio of each component microstructure (bainite and tempered martensite) divided by the measured area is calculated for each of the three views using Adobe Photoshop by Adobe Systems Inc., and these values are averaged to obtain the area ratio of each microstructure.

Volume fraction of retained austenite: more than 5%

When the volume fraction of retained austenite is 5% or less, ductility of the base metal is reduced, and ductility of the clad steel plate may also be reduced. Therefore, the volume fraction of retained austenite is more than 5%. The volume fraction of retained austenite is preferably 6% or more. The volume fraction of retained austenite is more preferably 7% or more. The volume fraction of retained austenite is even more preferably 8% or more. The upper limit of the volume fraction of retained austenite is not particularly limited. The volume fraction of retained austenite is preferably 45% or less.

Here, the volume fraction of retained austenite is measured as follows. The clad steel plate is machine ground in the thickness direction (depth direction) to a ¼ position of the sheet thickness of the base metal, and then chemically polished with oxalic acid to prepare the observation plane. The observation plane is then observed by X-ray diffraction. CoKα radiation is used for incident X-rays to determine a ratio of diffraction intensity of the {200}, {220} and {311} planes of fcc iron (austenite) to diffraction intensity of the {200}, {211} and {220} planes of bcc iron, and the volume fraction of retained austenite is calculated from the ratio of diffraction intensity of each plane.

The area ratio of residual microstructure other than bainite, tempered martensite, and retained austenite is preferably 30% or less. The area ratio of the residual microstructure is more preferably 20% or less. The residual microstructure includes known microstructures such as ferrite, martensite, pearlite, cementite, and other carbides. The presence or absence of residual microstructure may be confirmed and determined by SEM observation, for example. The area ratio of the residual microstructure may be 0%. The area ratio of the residual microstructure is calculated as follows.

$$[\text{area ratio of residual microstructure (\%)}]=100\%- \\ [\text{total area ratio of bainite and tempered marten-} \\ \text{site (\%)}]-[\text{volume fraction of retained austenite} \\ \text{(\%)}]$$

Here, the retained austenite is assumed to be homogeneous in three dimensions, that is, the volume fraction of the retained austenite is taken to be equivalent to the area ratio of retained austenite in the calculation of the area ratio of residual microstructure.

[1-4] Steel Microstructure of Cladding Metal

Next, the steel microstructure of the cladding metal of the clad steel plate according to an embodiment of the present disclosure is described.

The steel microstructure of the cladding metal of the clad steel plate according to an embodiment of the disclosure is a steel microstructure having an area ratio of ferrite: 80% or more.

Area ratio of ferrite: 80% or more

To secure good bendability and collision resistance, the area ratio of ferrite needs to be 80% or more. The area ratio of ferrite is preferably 90% or more. The upper limit of the area ratio of ferrite is not particularly limited, and may be 100%.

Here, the area ratio of ferrite is measured as follows. The area ratio is measured at a position at ¼ of the thickness of the cladding metal.

That is, a sample is cut such that an observation plane is a thickness cross-section parallel to the rolling direction of the clad steel plate. The observed plane is then mirror-polished using diamond paste, followed by finish polishing using colloidal silica, and then etching with 3 vol. % nital to reveal the microstructure. Then, three views of a 17 μm×23 μm field of view of the observation plane of the sample are observed using a scanning electron microscope (SEM) at an accelerating voltage of 15 kV and a magnification of 5000 times. In the obtained microstructure image, the area ratio of the component microstructure (ferrite) divided by the measured area is calculated for each of the three views using Adobe Photoshop by Adobe Systems Inc., and these values are averaged to obtain the area ratio of the microstructure.

The area ratio of residual microstructure other than ferrite is preferably 20% or less. The area ratio of the residual microstructure is more preferably 10% or less. The residual microstructure includes known microstructures such as non-recrystallized ferrite, martensite, tempered martensite, retained austenite, bainite, pearlite, cementite, and other carbides. The presence or absence of residual microstructure may be confirmed and determined by SEM observation, for example. The area ratio of the residual microstructure may be 0%. The area ratio of the residual microstructure is calculated as follows.

$$[\text{area ratio of residual microstructure (\%)}]=100-[\text{area} \\ \text{ratio of ferrite (\%)}]$$

[1-5] Average Vickers Hardness (HVL) of Cladding Metal, Value of Average Vickers Hardness (HVL) of Cladding Metal Divided by Average Vickers Hardness (HVB) of Base Metal, Boundary Roughness of Base Metal and Cladding Metal, and Number of Voids at Boundary Between Base Metal and Cladding Metal

Next, the following items of particular importance in the clad steel plate according to an embodiment of the disclosure are described: the average Vickers hardness (HVL) of the cladding metal, the average Vickers hardness (HVL) of the cladding metal divided by the average Vickers hardness (HVB) of the base metal, the boundary roughness of the base metal and the cladding metal and the number of voids at the boundary between the base metal and the cladding metal.

Average Vickers hardness (HVL) of cladding metal: 260 or less

To secure good bendability, collision resistance, and LME resistance, the average Vickers hardness (HVL) of the cladding metal needs to be 260 or less. The average Vickers hardness (HVL) of the cladding metal is preferably 250 or less. The lower limit of the average Vickers hardness (HVL) of the cladding metal is not particularly limited. The average Vickers hardness (HVL) of the cladding metal is preferably 85 or more. Note that both of the cladding metals joined to the front and back surfaces of the base metal need to satisfy the requirements. The same applies to the value obtained by dividing the average Vickers hardness (HVL) of the cladding metal by the average Vickers hardness (HVB) of the base metal, as described below.

Average Vickers hardness (HVL) of cladding metal divided by average Vickers hardness (HVB) of base metal (hereinafter also referred to as cladding metal to base metal hardness ratio): 0.80 or less To secure good bendability and collision resistance, the cladding metal to base metal hardness ratio needs to be 0.80 or less. The cladding metal to base metal hardness ratio is preferably 0.75 or less. The lower limit of the cladding metal to base metal hardness ratio is not particularly limited. The cladding metal to base metal hardness ratio is preferably 0.07 or more.

Here, the average Vickers hardness (HVB) of the base metal is measured as follows.

The Vickers hardness at a central position of sheet thickness of the base metal is measured with a 1 kg indentation load. Then, from a measurement point (position), the Vickers hardness is measured at 10 points on a line parallel to the rolling direction with the 1 kg indentation load, and the average value of these points is obtained.

The average Vickers hardness (HVL) of the cladding metal is measured as follows.

The Vickers hardness at a central position of sheet thickness of the cladding metal is measured with a 100 g indentation load. Then, from a measurement point (position), the Vickers hardness is measured at 10 points on a line parallel to the rolling direction with the 100 g indentation load, and the average value of these points is obtained. The average of these values is then used as the average Vickers hardness (HVL) of the cladding metal.

The distance between each measurement point in the measurement of the average Vickers hardness (HVB) of the base metal and the average Vickers hardness (HVL) of the cladding metal is preferably at least three times the distance of the indentation, if possible. Here, the "distance at least three times the distance of the indentation" means a distance of at least three times the length of a diagonal line in the rectangular aperture of the indentation created by the diamond indenter during the measurement of Vickers hardness.

Boundary roughness between base metal and cladding metal: 50 μm or less at maximum height Ry To secure good bendability and collision resistance, the boundary roughness between the base metal and the cladding metal needs to be 50 μm or less at Ry. When the boundary roughness between the base metal and the cladding metal is greater than 50 μm at the maximum height Ry, stress tends to concentrate at the boundaries between the base metal and the cladding metal during bend tests (during press forming) and crush tests (during automotive body impact), which may lead to initiation points for cracking. The boundary roughness between the base metal and the cladding metal is preferably 30 μm or less at the maximum height Ry. The requirement needs to be satisfied at both the front and back boundaries of the base metal. The lower limit of the boundary roughness between the base metal and the cladding metal is not particularly limited. The boundary roughness between the base metal and the cladding metal is preferably 5 μm or more at the maximum height Ry.

The maximum height (Ry) is calculated in accordance with Japanese Industrial Standards JIS B 0601 (1994) and JIS B 0031 (1994).

Specifically, a sample is cut such that an observation plane is a thickness cross-section parallel to the rolling direction of the clad steel plate. The observed plane is then mirror-polished using diamond paste, followed by finish polishing using colloidal silica, and then etching with 3 vol. % nital to reveal the microstructure. Then, five views of boundary positions between the base metal and the cladding metal are observed using a SEM at an accelerating voltage of 15 kW and a magnification of 150 times. Using Adobe Photoshop, the boundary between the base metal and the cladding metal is clarified by contrast difference, and then the maximum height (Ry) is calculated according to the calculation formula in JIS B 0601 (1994) and JIS B 0031 (1994).

Number of voids at boundary between base metal and cladding metal: 20 or fewer per 10 mm boundary length To secure good bendability and collision resistance, the number of voids at the boundary between the base metal and the cladding metal needs to be 20 or fewer per 10 mm of boundary length. When the number of voids at the boundary between the base metal and the cladding metal exceeds 20 per 10 mm of boundary length, the voids at the boundaries between the base metal and the cladding metal become initiation points for cracking during bend tests (during press forming) and crush tests (during automotive body impact). Further, connection of voids due to the increase in the number of voids contributes to crack propagation. The number of voids at the boundary between the base metal and the cladding metal is preferably 15 or fewer per 10 mm of boundary length. The lower limit of the number of voids per 10 mm of boundary length at the boundary between the base metal and the cladding metal is not particularly limited and may be 0. The requirement needs to be satisfied at both the front and back boundaries of the base metal.

Here, the number of voids at the boundary between the base metal and the cladding metal is measured as follows A sample is cut such that an observation plane is a thickness cross-section (L-section) parallel to the rolling direction of the clad steel plate. The observed plane is then mirror-polished using diamond paste, followed by finish polishing using colloidal silica, and then etching with 3 vol. % nital to reveal the microstructure. Then, 30 views of boundary positions between the base metal and the cladding metal are observed using a SEM at an accelerating voltage of 15 kW and a magnification of 3,000 times. The number of voids observed in all 30 fields of view (total number) is then counted. The number of observed voids (total number) is divided by the total length (in the rolling direction of the clad steel plate) in the observation area of the 30 views (mm), and multiplied by 10 to obtain the number of voids at the boundary between the base metal and cladding metal per 10 mm boundary length.

[1-6] Thickness

The thickness of the clad steel plate according to an embodiment of the disclosure is not particularly limited. The thickness of the clad steel plate is preferably 0.5 mm or more. The thickness of the clad steel plate is preferably 3.0 mm or less. The thickness of the base metal is preferably 0.2 mm or more. The thickness of the base metal is preferably 2.8 mm or less. The total thickness of the cladding metal is preferably 0.2 mm or more. The total thickness of the cladding metal is preferably 2.8 mm or less. The thickness per sheet of the cladding metal is preferably 0.1 mm or more. The thickness per sheet of the cladding metal is preferably 1.4 mm or less.

The thickness of the base metal divided by the total thickness of the cladding metal is preferably 1 or more.

Thickness of base metal divided by total thickness of cladding metal: 1 or more

Higher maximum loads (F) in Verband der Automobilindustrie (VDA) bend and V-bend—orthogonal VDA bend tests may be obtained when the thickness of the base metal divided by the total thickness of the cladding metal is 1 or more. Therefore, the value obtained by dividing the thickness of the base metal by the total thickness of the cladding metal is preferably 1 or more. The upper limit of the value obtained by dividing the thickness of the base metal by the total thickness of the cladding metal is not particularly limited. The value obtained by dividing the thickness of the base metal by the total thickness of the cladding metal is preferably 30 or less.

[1-7] Coated or Plated Layer

The clad steel plate according to an embodiment of the present disclosure may have a coated or plated layer on a surface thereof, for example a galvanized layer, a galvannealed layer, or an electrogalvanized layer.

The compositions of the galvanized layer, the galvannealed layer, and the electrogalvanized layer are not particularly limited as long as the main component is Zn, but an example composition contains: Fe: 20 mass % or less, Al: 0.001 mass % or more and 1.0 mass % or less, and a total amount of 0 mass % or more and 3.5 mass % or less of at least one selected from the group consisting of Pb, Sb, Si, Sn, Mg, Mn, Ni, Cr, Co, Ca, Cu, Li, Ti, Be, Bi, and REM, with the balance being Zn and inevitable impurity.

The Fe content in the galvanized layer is preferably less than 7 mass %. The Fe content in the galvannealed layer is preferably 7 mass % to 15 mass %. The Fe content in the galvannealed layer is more preferably 8 mass % to 12 mass %.

The coating weight is not particularly limited. The coating weight per one side is preferably 20 g/m$^2$ to 80 g/m$^2$.

[1-8] Amount of Diffusible Hydrogen

In the clad steel plate according to an embodiment of the present disclosure, the total amount of diffusible hydrogen in the base metal and the cladding metal is preferably 0.50 mass ppm or less.

Total amount of diffusible hydrogen in base metal and cladding metal: 0.50 mass ppm or less In the clad steel plate according to an embodiment of the present disclosure, from the viewpoint of obtaining better bendability, the total amount of diffusible hydrogen in the base metal and the cladding metal is preferably 0.50 mass ppm or less. The amount of diffusible hydrogen is more preferably 0.35 mass ppm or less. The lower limit of the amount of steel diffusible hydrogen is not particularly specified, but the amount of diffusible hydrogen in a steel sheet is commonly 0.01 mass ppm or more in view of production technology constraints.

The total amount of diffusible hydrogen in the base metal and the cladding metal is measured as follows.

A test piece having a length of 30 mm and a width of 5 mm is taken from the clad steel plate, and when there is a coated or plated layer on a surface, the coated or plated layer is removed with alkali. Then, an amount of hydrogen released from the test piece is measured by a thermal desorption analysis method. Specifically, the test piece is continuously heated from room temperature to 300° C. at a rate of 200° C./h, and then cooled to room temperature. At this time, the amount of hydrogen released from the test piece in the temperature range from room temperature to 210° C. during the continuous heating is measured (cumulative hydrogen amount). The measured hydrogen amount is then divided by the mass of the test piece (after removal of the coated or plated layer if present and before the continuous heating), and a value converted to mass ppm units is the total amount of diffusible hydrogen of the base metal and the cladding metal.

For a product (member) after forming or joining of a clad steel plate, a test piece is cut from the product under a general operating environment, and the amount of diffusible hydrogen in the base metal and the cladding metal is measured in the same manner as described above. When the value is 0.50 mass ppm or less, the total amount of diffusible hydrogen in the base metal and the cladding metal of the clad steel plate at the material stage before forming or joining may also be considered to be 0.50 mass ppm or less.

[2] Member

A member according to an embodiment of the present disclosure is described below.

The member according to an embodiment of the present disclosure is a member made using the clad steel plate described above as a material. For example, the material, the clad steel plate, is subjected to at least one of a forming process and a joining process to make the member.

Here, the clad steel plate has a tensile strength (TS) of 780 MPa or more and has excellent ductility, bendability, collision resistance, and LME resistance. Therefore, the member according to an embodiment of the disclosure is not only high-strength, but also has excellent anti-crash properties in the event of a crash while driving. In addition to the high strength of 780 MPa or more, the steel sheet is also resistant to LME cracking even when coated or plated. Therefore, the member according to an embodiment of the present disclosure is suitable as an impact energy absorbing member for use in the automotive field.

[3] Method of Producing Clad Steel Plate

A method of producing the clad steel plate according to an embodiment of the present disclosure is described below. The temperatures used in heating or cooling the slabs and steel sheets and the like indicated below refer to the surface temperatures of the steel slabs and the steel sheets and the like, unless otherwise indicated.

The method of producing the clad steel plate according to an embodiment of the disclosure includes:

a first preparation process of preparing a base metal steel slab comprising the chemical composition of the base metal;

a second preparation process of preparing cladding metal steel slabs each comprising the chemical composition of the cladding metal;

a surface treatment process of surface treating both front and back surfaces of the base metal steel slab and at least one of front and back surfaces of each of the cladding metal steel slabs to have a surface roughness Ra of 30 μm or less;

a stacking process of stacking the base metal steel slab and the cladding metal steel slabs in the order of one the cladding metal steel slabs—the base metal steel slab—one of the cladding metal steel slabs so that the surface treated surfaces of the base metal steel slab and the surface treated surfaces of the cladding metal steel slabs are in contact, to obtain a stacked slab;

a joining process of joining the cladding metal steel slabs and the base metal steel slab, and creating a vacuum of $1 \times 10^{-2}$ Torr or less between the cladding metal steel slabs and the base metal steel slab to obtain a joined stacked slab;

a hot rolling process of heating the joined stacked slab to a temperature range from 1,050° C. or more to 1,350° C. or less, then hot rolling under a set of conditions including a rolling finish temperature of 820° C. or more to obtain a hot-rolled steel sheet;

a cold rolling process of cold rolling the hot-rolled steel sheet under a set of conditions including a cold rolling reduction ratio of 30% or more to 80% or less to obtain a cold-rolled steel sheet; and an annealing process of annealing the cold-rolled steel sheet under a set of conditions including an annealing temperature of 750° C. or more and 950° C. or less and a holding time of 20 s or more.

First Preparation Process

The base metal steel slab comprising the chemical composition of the base metal is prepared. For example, steel raw material is melted to produce base metal having the chemical composition of the base metal described above. The steelmaking method is not particularly limited, and any known steelmaking method may be applied, such as converter steelmaking, electric furnace steelmaking, and the like. The obtained molten steel is solidified to produce a steel slab. The method of producing a steel slab from molten steel is not particularly limited and continuous casting, ingot making, and thin slab casting methods may be used. To help prevent macro-segregation, steel slabs are preferably produced by a continuous casting method.

Second Preparation Process

Here, cladding metal steel slabs each comprising the chemical composition of the cladding metal described above are prepared. For example, steel raw material is melted to produce molten steel having the chemical composition of the cladding metal described above. The steelmaking method is not particularly limited, and any known steelmaking method may be applied, such as converter steelmaking, electric furnace steelmaking, and the like. The obtained molten steel is solidified to produce a steel slab. The method of producing a steel slab from molten steel is not particularly limited and continuous casting, ingot making, and thin slab casting methods may be used. To help prevent macro-segregation, steel slabs are preferably produced by a continuous casting method.

Surface Treatment Process

The surface roughness of both the front and back surfaces of the base metal steel slab and at least one of the front and back surfaces of the cladding metal steel slab prepared as described above is surface treated to a Ra of 30 μm or less (the lower limit of surface roughness is not particularly limited, but from the viewpoint of productivity and the like is preferably Ra of 1 μm or more). This enables the boundary roughness between the base metal and cladding metal of the final clad steel plate to be 50 μm or less at the maximum height Ry. This also allows for better joining of the base metal and the stacked material during the hot rolling process.

The surface treatment method is not particularly limited. For example, the surfaces may be finished by machine grinding.

The surface roughness Ra is measured in accordance with JIS B 0601 (1994) and JIS B 0031 (1994).

Stacking Process

The base metal steel slab and the cladding metal steel slabs are then stacked in the order of one of the cladding metal steel slabs—the base metal steel slab—one of the cladding metal steel slabs so that the surface treated surfaces of the base metal steel slab and the surface treated surfaces of the cladding metal steel slabs are in contact with each other (a sandwich structure with the base metal steel slab between the cladding metal steel slabs). The surfaces of the base metal steel slab and the cladding metal steel slabs may be cleaned before stacking.

Joining Process

The cladding metal steel slabs and the base metal steel slab are joined together, and a vacuum is created so that the vacuum between the cladding metal steel slabs and the base metal steel slabs is $1 \times 10^{-2}$ Torr or less to obtain a joined stacked slab (a sandwich structure with the base metal steel slab between the cladding metal steel slabs).

The joining method is not particularly limited, but for example, the base metal steel slab is placed between two of the cladding metal steel slabs to form a stacked slab, and the base metal steel slab and the cladding metal steel slabs are joined by electron beam welding (EBW), arc welding, or laser beam welding of four ends of the stacked slab (between the cladding metal steel slabs and the base metal steel slab).

By creating a high vacuum of $1 \times 10^{-2}$ Torr or less (the lower limit of the vacuum is not particularly limited, but is preferably $1 \times 10^{-7}$ Torr or more from the viewpoint of productivity and the like) between the cladding metal steel slabs and the base metal steel slab, joinability at the boundaries between the cladding metal steel slabs and the base metal steel slab may be increased. As a result, even when cold rolling is applied after hot rolling, the integrity of the join interface may be maintained without leading to voids between the cladding metal and the base metal, and a well-integrated clad steel plate (thin steel sheet) may be produced.

The method of creating a vacuum between the cladding metal steel slabs and the base metal steel slab is not particularly limited, but for example, when laser beam welding the four ends of a stacked slab, finally (but before the four ends are completely joined), a vacuum is created between the cladding metal steel slabs and the base metal steel slab by installing a valve for creating a vacuum between the cladding metal steel slabs and the base metal steel slab and connecting a vacuum pump connected to the valve.

Hot Rolling Process

The resulting joined stacked slab is then subjected to hot rolling, consisting of rough rolling and finish rolling, to produce a hot-rolled steel sheet.

In an example, the stacked slab produced as described above is temporarily cooled to room temperature, then slab heated and rolled.

Slab heating temperature: 1,050° C. or more and 1,350° C. or less

The slab heating temperature is 1,050° C. or more from the viewpoints of diffusion bonding between the cladding metal and the base metal, carbide dissolution, and reduction of rolling load. The slab heating temperature is 1,350° C. or less in order to help prevent increased scale loss. The slab heating temperature is based on the temperature of a joined stacked slab surface at the time of heating.

An energy saving process may be applied to the hot rolling process. Energy saving processes include hot charge rolling, where a produced steel slab is charged into a furnace as a warm slab without cooling to room temperature and then hot rolled, direct rolling, where a produced steel slab is hot rolled immediately after being subjected to heat retaining for a short period, and the like.

The joined stacked slab is then rough rolled according to a conventional method to produce a sheet bar. The sheet bar is then subjected to finish rolling to produce a hot-rolled steel sheet. When the slab heating temperature is low, heating the sheet bar using a bar heater or the like before finish rolling is preferable, from the viewpoint of preventing trouble during finish rolling.

Rolling Finish Temperature of 820° C. or More

The rolling finish temperature is preferably 820° C. or more to reduce rolling load, and because a high rolling reduction rate in a non-recrystallized state of austenite may result in the development of an abnormal microstructure elongated in the rolling direction, which may reduce the workability of the annealed sheet. The upper limit of the rolling finish temperature is not particularly limited. The rolling finish temperature is preferably 1,100° C. or less.

Further, finish rolling may be performed continuously by joining rough-rolled sheets during the hot rolling. Further, the rough-rolled sheet (sheet bar) may be temporarily coiled before finish rolling. Further, at least part of finish rolling may be conducted as lubrication rolling to reduce rolling load in the hot rolling. Conducting lubrication rolling in such a manner is effective from the perspective of making the shape and material properties of the steel sheet uniform. In lubrication rolling, the coefficient of friction is preferably 0.10 or more. The coefficient of friction is preferably 0.25 or less.

The coiling temperature after hot rolling is not particularly limited. The coiling temperature after hot rolling is preferably 450° C. or more. The coiling temperature after hot rolling is preferably 750° C. or less.

The hot-rolled steel sheet is then optionally subjected to pickling. Pickling may remove oxides from the steel sheet surface, and is thus important to ensure that the steel sheet as the final product has good chemical convertibility and a sufficient quality of coating. Pickling may be performed in one or more batches.

Cold Rolling Process

The hot-rolled steel sheet is then subjected to cold rolling to obtain a cold-rolled steel sheet. Cold rolling is performed by multi-pass rolling that requires two or more passes, for example, tandem-type multi-stand rolling, reverse rolling and the like.

Rolling reduction in cold rolling: 30% or more and 80% or less

Rolling reduction in the cold rolling being 30% or more allows suppression of residual cracks and suppression of occurrence of cracks at the boundaries between the base metal and the cladding metal of the clad steel plate finally obtained. Further, recrystallization during heating in a subsequent process, the annealing process, is promoted and good bendability may be obtained. Therefore, the rolling reduction of the cold rolling is 30% or more. The rolling reduction of the cold rolling is preferably 35% or more. On the other hand, when the rolling reduction of the cold rolling exceeds 80%, the integrity of the join interfaces is not ensured, and therefore the rolling reduction of the cold rolling is 80% or less.

The number of cold rolling passes and the like are not particularly limited.

Annealing Process

The cold-rolled steel sheet is annealed under a set of conditions including an annealing temperature of 750° C. or more and 950° C. or less and a holding time of 20 s or more.

Annealing temperature: 750° C. or more and 950° C. or less, holding time: 20 s or more The hardness of martensite formed from retained austenite during bending deformation increases greatly, resulting in reduced bendability and collision resistance. When the annealing temperature is less than 750° C. or the holding time is less than 20 s, non-recrystallized ferrite remains in the cladding metal, resulting in reduced bendability and collision resistance. Further, in the base metal, the proportion of austenite formed during annealing is insufficient. As a result, the area ratio of ferrite increases, making achieving a TS of 780 MPa or more difficult. On the other hand, when the annealing temperature exceeds 950° C., defects may occur on the surface of the cladding metal. Therefore, the annealing temperature is 750° C. or more and 950° C. or less. The annealing temperature is preferably 760° C. or more. The annealing temperature is preferably 920° C. or less. The holding time is not particularly limited. The holding time is preferably 600 s or less. The annealing temperature is the maximum arrival temperature during the annealing process. Further, the holding time includes not only the holding time at the annealing temperature, but also the time in the temperature range from (annealing temperature −40° C.) or more to the annealing temperature or less during heating and cooling before and after reaching the annealing temperature.

Cooling after holding is not particularly limited and may be performed in accordance with a conventional method. After the annealing process, a reheating process may optionally be performed according to the following conditions. This case is described below as Embodiment 1, pertaining to an optional process after the annealing process.

Embodiment 1

First Reheating Process

Here, after the annealing process, the cold-rolled steel sheet is cooled to a cooling stop temperature of 250° C. or less, then reheated to a temperature range from greater than 250° C. to 450° C. or less and held for 10 s or more.

Cooling stop temperature: 250° C. or less

The cooling stop temperature being 250° C. or less, which is below the martensitic transformation start temperature, may increase the area ratio of tempered martensite formed during reheating, as described below. The amount of diffusible hydrogen in the steel sheet is reduced by transforming some austenite to martensite at the point of the cooling stop. As a result, the amount of void formation during bending deformation is reduced, further improving bendability and collision resistance. Therefore, the cooling stop temperature is preferably 250° C. or less. The cooling stop temperature is more preferably 200° C. or less. The lower limit of the cooling stop temperature is not particularly limited. The cooling stop temperature is preferably −30° C. or more.

The average cooling rate from the end of holding in the annealing process to the cooling stop temperature is not particularly limited. The average cooling rate is preferably 1° C./s or more. The average cooling rate is preferably 50° C./s or less.

Reheating temperature: more than 250° C. and 450° C. or less

After the cooling is stopped, the cold-rolled steel sheet is reheated to a temperature range from more than 250° C. to 450° C. or less, and held in the temperature range for 10 s or more. The reheating temperature being more than 250° C. further promotes tempering of martensite present at the time of the cooling stop. However, when the reheating temperature exceeds 450° C., the amount of diffusible hydrogen in the steel sheet may also increase as the area ratio of quenched martensite increases. This may lead to reduced bendability and collision resistance. Therefore, the reheating temperature is preferably more than 250° C. The reheating temperature is preferably 450° C. or less. The reheating temperature is more preferably 300° C. or more. The reheating temperature is more preferably 400° C. or less. The reheating temperature is the maximum arrival temperature in the reheating process.

Holding time: 10 s or more

When the holding time in the reheating temperature range (more than 250° C. to 450° C. or less) is less than 10 s, the amount of diffusible hydrogen in the steel sheet may also increase as the area ratio of quenched martensite increases. This may lead to reduced bendability and collision resistance. Therefore, the holding time in the reheating temperature range is preferably 10 s or more. The upper limit of the holding time in the reheating temperature range is not particularly limited. The holding time in the reheating temperature range is preferably 1,000 s or less in view of production technology constraints. The holding time in the reheating temperature range is more preferably 10 s or more. The holding time in the reheating temperature range is more preferably 300 s or less. The holding time in the reheating temperature range includes not only the holding time at the reheating temperature, but also the time in the reheating temperature range (more than 250° C. to 450° C. or less) during heating and cooling before and after reaching the reheating temperature.

The average cooling rate after holding at the reheating temperature, the cooling stop temperature, and the cooling method are not particularly limited. Gas jet cooling, mist cooling, roll cooling, water cooling, air cooling, and the like may be applied as cooling methods. From the viewpoint of preventing steel surface oxidation, after holding in the reheating temperature range, cooling down to 50° C. or less is preferable. Cooling to room temperature is more preferable. The average cooling rate for the cooling is typically 1° C./s or more and 50° C./s or less.

A cold-rolled steel sheet that has undergone the above process may also be subjected to temper rolling. The rolling reduction in the temper rolling is preferably 1.50% or less, because when the rolling reduction exceeds 1.50%, the yield stress of the steel will increase and dimensional accuracy during forming will decrease. The lower limit of the rolling reduction in the temper rolling is not particularly limited. The rolling reduction in the temper rolling is preferably 0.05% or more from the viewpoint of productivity. The temper rolling may be performed on equipment that is continuous (on-line) with the annealing equipment used to perform the annealing process, and may be performed on equipment that is discontinuous (off-line) with the annealing equipment used to perform the annealing process. The target rolling reduction may be achieved in a single rolling or more than one rolling operation may be performed to achieve a total rolling reduction of 0.05% or more and 1.50% or less. The rolling described here generally refers to temper rolling, but rolling by a leveler or the like is also acceptable as long as the rolling provides an elongation rate equivalent to that of temper rolling.

24

Coating or Plating Process

After the annealing process or after the first reheating process, the cold-rolled steel sheet may be subjected to a coating or plating treatment. Coating or plating treatment methods are not particularly limited, and include, for example, hot-dip galvanizing treatment, galvannealing treatment, and electrogalvanization treatment. The conditions of the coating or plating treatment are not particularly limited and may follow a conventional method.

When hot-dip galvanizing treatment is performed, the cold-rolled steel sheet is preferably, for example, immersed in a galvanizing bath at 440° C. or more and 500° C. or less for hot-dip galvanizing treatment, after which coating weight adjustment is performed using gas wiping or the like. For hot-dip galvanizing, use of a galvanizing bath having a composition consisting of Al content of 0.10 mass % or more and 0.23 mass % or less, with the balance being Zn and inevitable impurity is preferable.

The hot-dip galvanizing treatment may use equipment configured so that the annealing and the hot-dip galvanizing treatment may be performed continuously to perform the annealing and the hot-dip galvanizing treatment.

When performing galvannealing treatment, performing galvanizing alloying treatment in a temperature range from 450° C. or more to 600° C. or less after performing the above hot-dip galvanizing treatment on the cold-rolled steel sheet is preferable. When the alloying temperature is less than 450° C., the Zn—Fe alloying rate may be excessively slow and alloying may be significantly more difficult. On the other hand, when the alloying temperature exceeds 600° C., untransformed austenite may transform to pearlite, resulting in a decrease in TS and ductility. Therefore, when a galvanized layer is subjected to alloying treatment, the alloying treatment is preferably performed in a temperature range from 450° C. or more to 600° C. or less. The alloying temperature is more preferably 470° C. or more. The alloying temperature is more preferably 550° C. or less. The alloying temperature is even more preferably 530° C. or less.

When applying electrogalvanization treatment, a coating weight of 20 g/m² to 80 g/m² per side is preferred, using a plating bath of room temperature or more and 100° C. or less.

The coating weight for both a hot-dip galvanized steel sheet (GI) and a galvannealed steel sheet (GA) is preferably 20 g/m² to 80 g/m² per side (coating both sides). The coating weight may be adjusted by gas wiping or the like after galvanizing.

The coated or plated steel sheet obtained by the coating or plating treatment as described above may be cooled down to 50° C. or less and then rolled at an elongation rate of 0.05% or more and 1.00% or less. The elongation rate of the rolling after the cooling to 50° C. or less is more preferably 0.10% or more. The elongation rate of the rolling after the cooling to 50° C. or less is more preferably 0.70% or less.

The rolling after cooling down to 50° C. or less may be performed on equipment that is continuous (on-line) with the coating or plating equipment used to perform the galvanizing treatment described above, or it may be performed on equipment that is discontinuous (off-line) with the coating or plating equipment used to perform the galvanizing treatment. The target elongation rate may be achieved in a single rolling or more than one rolling operation may be performed to achieve a total elongation rate of 0.05% or more and 1.00% or less. The rolling described here generally refers to temper rolling, but rolling by leveler processing or the like is also acceptable as long as the rolling provides an elongation rate equivalent to that of temper rolling.

Dehydrogenation Treatment Process

The coated or plated steel sheet described above is preferably further dehydrogenated by holding at a temperature range from 50° C. or more to 300° C. or less for 0.5 h or more and 72.0 h or less. Dehydrogenation may further reduce the amount of diffusible hydrogen in the coated or plated steel sheet. As a result, the amount of void formation after blanking is reduced and stretch flangeability (hole expansion formability) may be further improved. When held in a temperature range above 300° C. or for more than 72.0 h, tempering may make achieving the desired TS difficult. When held at less than 50° C. or for less than 0.5 h, the effect of reducing the amount of diffusible hydrogen in the coated or plated steel sheet may not be fully achieved. Therefore, in the dehydrogenation treatment process, the coated or plated steel sheet is preferably held at a temperature range from 50° C. or more to 300° C. or less for 0.5 h or more and 72.0 h or less. In the dehydrogenation treatment process, the coated or plated steel sheet is more preferably held at a temperature range from 70° C. or more to 200° C. or less for 1 h or more and 36.0 h or less.

The dehydrogenation treatment may be applied to the cold-rolled steel sheet after the annealing process or after the reheating process.

As another Embodiment, after the holding of the annealing process, the cold-rolled steel sheet may be cooled to a temperature range from, for example, 350° C. or more to 600° C. or less, followed by a coating or plating process in which the cold-rolled steel sheet is subject to a hot-dip galvanizing treatment or a galvannealing treatment and a second reheating process. This case is described below as Embodiment 2, pertaining to an optional process after the annealing process.

Embodiment 2

Coating Process

After the holding of the annealing process, the cold-rolled steel sheet is cooled to a temperature range from, for example, 350° C. or more to 600° C. or less, followed by hot-dip galvanizing treatment or galvannealing treatment of the cold-rolled steel sheet.

The conditions for the hot-dip galvanizing treatment and the galvannealing treatment are the same as those of Embodiment 1 described above, and are therefore not repeated here.

Second Reheating Process

After the above coating process, the coated steel sheet is cooled to a cooling stop temperature of 250° C. or less, and then reheated to a temperature range from more than 250° C. to 450° C. or less and held for 10 s or more.

Cooling stop temperature: 250° C. or less

The cooling stop temperature being 250° C. or less, which is below the martensitic transformation start temperature, may increase the area ratio of tempered martensite formed during reheating, as described below. The amount of diffusible hydrogen in the steel sheet is reduced by transforming some austenite to martensite at the point of the cooling stop. As a result, the amount of void formation during bending deformation is reduced, further improving bendability and collision resistance. Therefore, the cooling stop temperature is preferably 250° C. or less. The cooling stop temperature is more preferably 200° C. or less. The lower limit of the cooling stop temperature is not particularly limited. The cooling stop temperature is preferably −30° C. or more.

Reheating temperature: more than 250° C. to 450° C. or less

After the above cooling is stopped, the cold-rolled steel sheet is reheated to a temperature range from more than 250° C. to 450° C. or less and held in the temperature range for 10 s or more. The reheating temperature being more than 250° C. promotes dehydrogenation due to the release of diffusible hydrogen in the steel sheet. However, when the reheating temperature exceeds 450° C., the amount of diffusible hydrogen in the steel sheet may also increase as the area ratio of quenched martensite increases. This may lead to reduced bendability and collision resistance. Therefore, the reheating temperature is preferably more than 250° C., and 450° C. or less. The reheating temperature is the maximum arrival temperature in the reheating process.

Holding time: 10 s or more

When the holding time in the reheating temperature range (more than 250° C., and 450° C. or less) is less than 10 s, the amount of diffusible hydrogen in the steel sheet may also increase as the area ratio of quenched martensite increases. This may lead to reduced bendability and collision resistance. Therefore, the holding time in the reheating temperature range is preferably 10 s or more. The upper limit of the holding time in the reheating temperature range is not particularly limited. The holding time in the reheating temperature range is preferably 1,000 s or less in view of production technology constraints. The holding time in the reheating temperature range is more preferably 10 s or more. The holding time in the reheating temperature range is more preferably 300 s or less. The holding time in the reheating temperature range includes not only the holding time at the reheating temperature, but also the time in the reheating temperature range (more than 250° C. to 450° C. or less) during heating and cooling before and after reaching the reheating temperature.

The average cooling rate after holding at the reheating temperature, the cooling stop temperature, and the cooling method are not particularly limited. Gas jet cooling, mist cooling, roll cooling, water cooling, air cooling, and the like may be applied as cooling methods. From the viewpoint of preventing steel surface oxidation, after holding in the reheating temperature range, cooling down to 50° C. or less is preferable. Cooling to room temperature is more preferable. The average cooling rate for the cooling is typically 1° C./s or more and 50° C./s or less.

Dehydrogenation Treatment Process

The coated or plated steel sheet described above is preferably further dehydrogenated by holding at a temperature range from 50° C. or more to 300° C. or less for 0.5 h or more and 72.0 h or less. The conditions for the dehydrogenation treatment and the like are the same as those of Embodiment 1 described above, and are therefore not repeated here.

Conditions other than those described may follow a conventional method. In the series of heat treatments in the method of producing the clad steel plate according to an embodiment of the present disclosure, the holding temperature does not need to be constant as long as the holding temperature is within the temperature range described above, and even if the cooling rate changes during cooling, there is no particular problem as long as the cooling rate is within the specified range. Further, the steel sheet may be heat-treated with any equipment as long as the required thermal history is satisfied.

[4] Method of Producing Member

The following describes a method of producing a member according to an embodiment of the present disclosure.

The method of producing a member according to an embodiment of the present disclosure includes a process of forming or joining at least one of the clad steel plate (for example, the clad steel plate produced by the method of producing the clad steel plate) into a member by applying at least one of a forming process and a joining process.

Here, the method of the forming process is not particularly limited, and a general processing method such as press working may be used, for example. The method of the joining process is also not particularly limited, and for example, general welding such as spot welding, laser welding, arc welding, and the like, rivet joining, swaging joining, and the like may be used. Forming and joining conditions are not particularly limited and may follow a conventional method.

EXAMPLES

The present disclosure is specifically described with reference to Examples. However, the scope of the present disclosure is not limited to the following examples.

Steel material having the chemical compositions listed in Table 1-1 each with the balance consisting of Fe and inevitable impurity was melted in a converter, and a base metal steel slab was prepared by continuous casting. Steel material having the chemical compositions listed in Table 1-2 each with the balance consisting of Fe and inevitable impurity was melted in a converter, and a cladding metal steel slab was prepared by continuous casting. Both the front and back surfaces of the base metal steel slab and one of the front and back surfaces of the cladding metal steel slab were then surface treated to adjust the surface roughness. The "Surface roughness Ra" in Table 2 is the maximum value of the surface roughness Ra of the surface treated surface (the surface where the base metal steel slab meets the cladding metal steel slab). The base metal steel slab and cladding metal steel slabs were then stacked in the order of one of the cladding metal steel slabs—the base metal steel slab—one of the cladding metal steel slabs so that the surface treated surfaces of the base metal steel slab and the surface treated surfaces of the cladding metal steel slabs were in contact, obtaining a stacked slab. The cladding metal steel slabs and the base metal steel slab were then joined, obtaining a joined stacked slab. In this process, a vacuum was created between the cladding metal steel slabs and the base metal steel slab under the conditions listed in Table 2. In No. 45, a steel slab consisting only of the base metal steel slab was used without stacking the cladding metal steel slabs.

The obtained joined stacked slab was heated to the slab heating temperature indicated in Table 2 and rough rolled. The hot-rolled steel sheet was then subjected to finish rolling at the rolling finish temperature indicated in Table 2. The cold rolling process and the annealing process were then performed under the conditions indicated in Table 2 to obtain a cold-rolled steel sheet (CR).

Some of the cold-rolled steel sheets were then subjected to the production process of Embodiment 1 (the first reheating process and the coating or plating process), some to the production process of Embodiment 2 (the coating or plating process and the second reheating process), and some to a coating or plating treatment after cooling to room temperature, under the conditions listed in Table 2. For convenience, the cooling stop temperature after the annealing process is listed in the column of the cooling stop temperature of the first reheating process. The "-" in the column of the cooling stop temperature of the first reheating process means cooling to room temperature after the annealing process.

In the coating or plating process, the cold-rolled steel sheet was coated or plated to obtain a hot-dip galvanized steel sheet (GI), a galvannealed steel sheet (GA), or an electrogalvanized steel sheet (EG). In the case of producing GI, a hot-dip galvanizing bath was used that had a composition of Al: 0.20 mass % with the balance being Zn and inevitable impurity. In the case of producing GA, a galvanizing bath was used that had a composition of Al: 0.14 mass % with the balance being Zn and inevitable impurity. The bath temperature was 470° C. for both GI and GA production. The coating weight was about 45 $g/m^2$ to 72 $g/m^2$ per side (double-sided coating) when producing GI and 45 $g/m^2$ per side (double-sided coating) when producing GA.

The alloying treatment when producing GA was performed at the temperatures listed in Table 2. In the case of GI, the composition of the coated layer was Fe: 0.1 mass % to 1.0 mass %, Al: 0.2 mass % to 1.0 mass %, with the balance being Zn and inevitable impurity. In the case of GA, the composition of the coated layer was Fe: 7 mass % to 15 mass %, Al: 0.1 mass % to 1.0 mass %, with the balance being Zn and inevitable impurity.

When producing EG, a plating bath at 30° C. was used, and the coating weight per side was about 20 $g/m^2$ to 50 $g/m^2$.

Some coated or plated steel sheets were further dehydrogenated under the conditions listed in Table 2.

The cold-rolled and coated or plated steel sheets obtained as described above were used as test pieces to evaluate tensile properties, bendability, collision resistance, and LME resistance according to the following test methods. Bendability was evaluated by a V-bend test. Collision resistance was evaluated by ultimate deformability, a VDA bend test, and a V-bend—orthogonal VDA bend test. Results are listed in Table 3. Hereafter, the rolling direction of a steel sheet is referred to as the L direction and the width direction of a steel sheet as the C direction.

The steel microstructure was identified and the average Vickers hardness was measured by methods described above. Results are listed in Table 3. The steel microstructure of the cladding metal, the boundary roughness between the base metal and the cladding metal, and the number of voids at the boundary between the base metal and the cladding metal were substantially the same for (1) cladding metal (front side) and (3) cladding metal (back side), so only (1) cladding metal (front side) is represented here.

<Tensile Properties>

Tensile testing was performed in accordance with JIS Z 2241. From the obtained steel sheet, a JIS No. 5 test piece was taken so that the longitudinal direction was in the C direction of the steel sheet. The test piece was subjected to tensile testing under a set of conditions including a cross-head velocity of 10 mm/min, and TS and total elongation (El) were measured. TS was considered acceptable at 780 MPa or more. Further, when TS was 780 MPa or more and less than 1,180 MPa, an El of 15% or more was judged to be good, and when TS was 1,180 MPa or more, an El of 12% or more was judged to be good.

<Ultimate Deformability>

The ultimate deformability was calculated using a method indicated by Mizunuma et al. in RIKEN Report, 45-4 (1969), 79. where tensile strain ($\varepsilon_i$) is obtained from sheet width strain ($\varepsilon_w$) and sheet thickness strain ($\varepsilon_t$) obtained from the tensile test described above.

$$\varepsilon_i = -(\varepsilon_w + \varepsilon_t)$$

$$\varepsilon_w = \ln(w/w_0), \varepsilon_t = \ln(t/t_0)$$

$w_0$: sheet width before tensile test, w: sheet width at fracture after tensile test $t_0$: thickness before tensile test, t: thickness at fracture after tensile test Ultimate deformability is known to correlate with hole expansion formability (stretch flangeability) from the reports of Nakagawa et al. in Journal of the Japan Society for Technology of Plasticity, 11-29 (1970), 142. and Matsufuji et al. in Journal of the Japan Society for Technology of Plasticity, 14-146 (1973), 201.

The ultimate deformability si was judged to be good when 0.8 or more for TS of 780 MPa or more and less than 1,180 MPa, and when 0.4 or more for TS of 1,180 MPa or more.

<V Bend Test>

A V (90°) bend test was performed in accordance with JIS Z 2248. Using test pieces having a thickness of 1.2 mm×a width of 100 mm (C direction)×a length of 35 mm (L direction) and having a thickness of 1.4 mm×a width of 100 mm (C direction)×a length of 35 mm (L direction) with ends processed, the bend radius R was varied under a set of conditions including a load of 10 tonnes, a stroke speed of 30 mm/min, and a holding time of 5 s. N3 evaluation was performed and R/t was calculated by dividing the minimum bend radius R, which is the smallest radius that does not cause cracking in any case, by the plate thickness t. Cracks with a length of 200 μm or more were determined to be cracks using a stereo microscope manufactured by Leica Microsystems at 25 times magnification.

For TS of 780 MPa or more to less than 1,180 MPa, R/t 3.0 was judged to be good, and for TS of 1,180 MPa, R/t 4.0 was judged to be good.

<VDA Bend Test>

VDA bend tests were performed in accordance with VDA 238-100. Using test pieces having a thickness of 1.2 mm×a width of 65 mm (C direction)×a length of 60 mm (L direction) or a thickness of 1.4 mm×a width of 70 mm (C direction)×a length of 60 mm (L direction) with ends processed, and a bend test machine with a distance between rollers of 2×plate thickness+0.5 mm and a tip end curvature radius of R=0.4 mm, VDA bend tests were performed by bending in the C direction (L axis bending) under a set of conditions including a stroke speed of 20 mm/min, and $\alpha_{VDA}$, maximum load F (N), stroke S (mm) to maximum load, and F×S were measured. The $\alpha_{VDA}$ and F×S (N·mm) obtained by the VDA bend test are known to correlate with wall portion fracture properties during axial crushing and bend crush properties.

For TS of 780 MPa or more to less than 1,180 MPa, F≥8,500 N, S≥12 mm, $\alpha_{VDA}$≥95°, and F×S≥102,000 N·mm were judged to be good.

For TS of 1,180 MPa or more, F≥10,500 N, S≥11 mm, $\alpha_{VDA}$≥90°, and F×S 115,500 N·mm were judged to be good.

<V Bend—Orthogonal VDA Bend Test>

The V-bend—orthogonal VDA bend tests were calculated based on the method described in JP 6748382 B by Sato et al. Using test pieces having a thickness of 1.2 mm×a width of 65 mm (C direction)×a length of 60 mm (L direction) or a thickness of 1.4 mm×a width of 65 mm (C direction)×a length of 60 mm (L direction) with ends processed, and under a set of conditions including a load of 10 tonnes, a stroke speed of 30 mm/min, and a holding time of 5 s, V (90°) bending was performed with a bend radius of R=5 mm in the L direction (C axis bending). The V-bent sample was rotated 90° horizontally, and then the V-bent sample was tested in a bending tester having a distance between rollers of 2×plate thickness+0.5 mm and a tip end curvature radius of R=0.4 mm under a set of conditions including a stroke speed of 20 mm/min, with a peak side of the bent part from the V-bend processing facing the punch side, bending in the C direction (L axis bending). Under these conditions, maximum load F, stroke S up to the maximum load, and F×S (N·mm) were measured. Correlation with the fracture properties of the bent ridge during axial crushing is known.

For TS of 780 MPa or more to less than 1,180 MPa, F≥6,500 N, S≥29 mm, and F×S≥188,500 N·mm were judged to be good.

For TS of 1,180 MPa or more, F≥7,000 N, S≥28 mm, and F×S≥196,000 N·mm were judged to be good.

<LME Resistance>

LME resistance was determined by resistance weld crack testing. Resistance welding (spot welding) was performed to produce a member where one sheet was a test piece cut into 30 mm×100 mm with the longitudinal direction perpendicular to the rolling direction of the obtained clad steel plate, and the other sheet was a 980 MPa class hot-dip galvanized steel sheet. The welding was performed by resistance spot welding using a resistance welding machine of servomotor pressure type at single phase alternating current (50 Hz) attached to a welding gun on a sheet combination of the stack of two steel sheets, with the sheet combination inclined by 5°. The welding was performed under a set of conditions including a pressure of 3.8 kN and a holding time of 0.2 s. The welding current was 5.7 kA to 6.2 kA, the current passage time was 21 cycles, and the holding time was 5 cycles. After welding, the test piece was cut in half, and a cross section was observed under an optical microscope, and those with no cracks of 0.1 mm or more were judged as having good LME cracking resistance ("O") and those with cracks of 0.1 mm or more as having poor LME cracking resistance ("x").

TABLE 1-1

| Steel sample | Base metal | | | | | | | | | | |
| | Chemical composition (mass %) | | | | | | | | | | |
| ID | C | Si | Mn | P | S | Al | N | Sb | Sn | Other | Remarks |
|---|---|---|---|---|---|---|---|---|---|---|---|
| A | 0.138 | 0.69 | 2.65 | 0.010 | 0.0020 | 0.041 | 0.0029 | — | — | — | Conforming steel |
| B | 0.111 | 1.41 | 2.75 | 0.012 | 0.0019 | 0.032 | 0.0033 | 0.0070 | — | — | Conforming steel |
| C | 0.192 | 1.55 | 2.12 | 0.008 | 0.0015 | 0.041 | 0.0036 | 0.0080 | — | — | Conforming steel |
| D | 0.176 | 1.37 | 2.89 | 0.007 | 0.0020 | 0.045 | 0.0030 | — | — | — | Conforming steel |
| F | 0.201 | 1.23 | 2.80 | 0.009 | 0.0010 | 0.042 | 0.0020 | — | — | Ti: 0.030, B: 0.0025 | Conforming steel |
| F | 0.225 | 1.24 | 2.95 | 0.009 | 0.0010 | 0.042 | 0.0020 | — | — | Ti: 0.020, B: 0.0019 | Conforming steel |
| G | 0.246 | 1.03 | 3.11 | 0.010 | 0.0009 | 0.028 | 0.0022 | 0.0055 | — | Nb: 0.021, Cu: 0.12 | Conforming steel |
| H | 0.232 | 0.89 | 2.85 | 0.007 | 0.0008 | 0.400 | 0.0029 | — | — | — | Conforming steel |
| I | 0.282 | 1.29 | 3.20 | 0.009 | 0.0009 | 0.034 | 0.0031 | 0.0085 | — | — | Conforming steel |
| J | 0.321 | 1.42 | 3.31 | 0.006 | 0.0008 | 0.042 | 0.0036 | — | 0.0080 | — | Conforming steel |
| K | 0.054 | 1.28 | 2.63 | 0.009 | 0.0012 | 0.032 | 0.0038 | — | — | — | Comparison steel |

TABLE 1-1-continued

|  |  |  | Base metal |  |  |  |  |  |  |  |  |
|---|---|---|---|---|---|---|---|---|---|---|---|
| Steel sample | Chemical composition (mass %) | | | | | | | | | | |
| ID | C | Si | Mn | P | S | Al | N | Sb | Sn | Other | Remarks |
| L | 0.179 | 2.82 | 2.57 | 0.010 | 0.0011 | 0.034 | 0.0029 | — | — | — | Comparison steel |
| M | 0.194 | 1.38 | 1.35 | 0.011 | 0.0015 | 0.026 | 0.0032 | — | — | — | Comparison steel |
| N | 0.105 | 1.56 | 2.62 | 0.008 | 0.0010 | 0.030 | 0.0032 | — | — | Ti: 0.032 | Conforming steel |
| O | 0.198 | 1.35 | 2.15 | 0.011 | 0.0014 | 0.042 | 0.0035 | 0.0120 | — | Nb: 0.051 | Conforming steel |
| P | 0.304 | 1.11 | 3.09 | 0.014 | 0.0030 | 0.029 | 0.0025 | — | — | V: 0.042 | Conforming steel |
| Q | 0.182 | 1.49 | 2.92 | 0.020 | 0.0021 | 0.045 | 0.0038 | — | 0.0070 | Ti: 0.022, B: 0.0018 | Conforming steel |
| R | 0.142 | 0.62 | 2.53 | 0.013 | 0.0015 | 0.042 | 0.0035 | 0.0050 | — | Cu: 0.18 | Conforming steel |
| S | 0.102 | 1.33 | 2.81 | 0.042 | 0.0013 | 0.031 | 0.0042 | — | — | Cr: 0.423 | Conforming steel |
| T | 0.190 | 1.50 | 2.15 | 0.015 | 0.0032 | 0.023 | 0.0029 | — | — | Ni: 0.754 | Conforming steel |
| U | 0.220 | 1.45 | 2.02 | 0.022 | 0.0023 | 0.032 | 0.0016 | — | — | Mo: 0.35 | Conforming steel |
| V | 0.182 | 1.45 | 2.85 | 0.015 | 0.0024 | 0.043 | 0.0024 | — | — | W: 0.022 | Conforming steel |
| W | 0.171 | 1.21 | 3.01 | 0.005 | 0.0028 | 0.032 | 0.0051 | — | — | Ta: 0.008 | Conforming steel |
| X | 0.238 | 1.03 | 2.76 | 0.010 | 0.0057 | 0.022 | 0.0022 | 0.0240 | — | Pb: 0.0050 | Conforming steel |
| Y | 0.252 | 0.82 | 2.79 | 0.011 | 0.0009 | 0.031 | 0.0027 | — | 0.0050 | Bi: 0.0040 | Conforming steel |
| Z | 0.222 | 1.15 | 3.10 | 0.014 | 0.0014 | 0.035 | 0.0042 | — | — | Se: 0.0100 | Conforming steel |
| AA | 0.233 | 0.94 | 3.21 | 0.023 | 0.0019 | 0.051 | 0.0044 | 0.0080 | 0.0035 | Te: 0.0110 | Conforming steel |
| AB | 0.241 | 0.74 | 3.34 | 0.012 | 0.0006 | 0.034 | 0.0040 | — | — | Ge: 0.0070 | Conforming steel |
| AC | 0.255 | 1.45 | 2.98 | 0.011 | 0.0035 | 0.023 | 0.0021 | — | — | As: 0.0090 | Conforming steel |
| AD | 0.250 | 1.10 | 3.10 | 0.033 | 0.0030 | 0.036 | 0.0040 | 0.0050 | — | Sr: 0.0080 | Conforming steel |
| AE | 0.243 | 0.97 | 3.22 | 0.015 | 0.0027 | 0.035 | 0.0035 | — | — | Cs: 0.0060 | Conforming steel |
| AF | 0.261 | 1.58 | 3.35 | 0.011 | 0.0041 | 0.051 | 0.0031 | — | 0.0095 | Zn: 0.008 | Conforming steel |
| AG | 0.275 | 1.24 | 3.21 | 0.003 | 0.0012 | 0.035 | 0.0023 | — | — | Co: 0.005 | Conforming steel |
| AH | 0.289 | 0.95 | 3.11 | 0.011 | 0.0022 | 0.030 | 0.0062 | 0.0025 | — | Ca: 0.0015 | Conforming steel |
| AI | 0.302 | 0.54 | 2.84 | 0.012 | 0.0006 | 0.014 | 0.0038 | — | — | Ce: 0.0025 | Conforming steel |
| AJ | 0.320 | 0.95 | 3.08 | 0.032 | 0.0009 | 0.033 | 0.0030 | — | 0.0040 | Mg: 0.0045 | Conforming steel |
| AK | 0.302 | 1.54 | 3.11 | 0.011 | 0.0035 | 0.031 | 0.0030 | — | — | Zr: 0.0035 | Conforming steel |
| AL | 0.318 | 1.15 | 3.12 | 0.007 | 0.0077 | 0.021 | 0.0028 | — | — | Hf: 0.0050 | Conforming steel |
| AM | 0.304 | 1.62 | 3.31 | 0.009 | 0.0020 | 0.032 | 0.0034 | 0.0080 | — | REM: 0.0030 | Conforming steel |
| AN | 0.312 | 1.24 | 3.25 | 0.011 | 0.0031 | 0.035 | 0.0030 | — | — | Zr: 0.0040 | Conforming steel |

"—" indicates content at inevitable impurity level.

TABLE 1-2

|  |  |  | Cladding metal |  |  |  |  |  |  |  |  |
|---|---|---|---|---|---|---|---|---|---|---|---|
| Steel sample ID | Chemical composition (mass %) | | | | | | | | | | |
|  | C | Si | Mn | P | S | Al | N | Sb | Sn | Other | Remarks |
| a | 0.002 | 0.02 | 0.22 | 0.018 | 0.0060 | 0.036 | 0.0028 | — | — | — | Conforming steel |
| b | 0.002 | 0.03 | 0.35 | 0.010 | 0.0055 | 0.030 | 0.0022 | 0.0080 | — | Ti: 0.032 | Conforming steel |
| c | 0.022 | 0.01 | 0.18 | 0.012 | 0.0075 | 0.045 | 0.0039 | — | — | — | Conforming steel |
| d | 0.088 | 0.46 | 1.72 | 0.011 | 0.0020 | 0.038 | 0.0025 | 0.0070 | — | — | Conforming steel |
| e | 0.083 | 0.22 | 2.28 | 0.013 | 0.0012 | 0.043 | 0.0030 | — | — | — | Conforming steel |
| f | 0.031 | 0.02 | 0.45 | 0.015 | 0.0045 | 0.095 | 0.0045 | — | — | — | Conforming steel |
| g | 0.155 | 0.05 | 1.65 | 0.008 | 0.0010 | 0.045 | 0.0040 | — | — | — | Comparison steel |
| h | 0.050 | 1.38 | 1.48 | 0.011 | 0.0012 | 0.038 | 0.0030 | — | — | — | Comparison steel |
| i | 0.020 | 0.02 | 2.80 | 0.019 | 0.0042 | 0.029 | 0.0048 | — | — | — | Comparison steel |
| j | 0.002 | 0.02 | 0.63 | 0.045 | 0.0085 | 0.055 | 0.0036 | — | — | Nb: 0.021 | Conforming steel |
| k | 0.082 | 0.25 | 1.82 | 0.030 | 0.0025 | 0.036 | 0.0028 | — | — | Cr: 0.205, V: 0.045 | Conforming steel |
| l | 0.003 | 0.03 | 0.18 | 0.016 | 0.0078 | 0.049 | 0.0023 | 0.0080 | — | Ti: 0.034, B: 0.0008 | Conforming steel |
| m | 0.080 | 0.02 | 1.88 | 0.013 | 0.0021 | 0.042 | 0.0032 | 0.0090 | — | Nb: 0.042, Ti: 0.019 | Conforming steel |
| n | 0.001 | 0.02 | 0.25 | 0.019 | 0.0070 | 0.040 | 0.0025 | — | — | Ti: 0.033, Cu: 0.18 | Conforming steel |
| o | 0.025 | 0.03 | 0.22 | 0.012 | 0.0055 | 0.032 | 0.0030 | 0.0040 | — | Cr: 0.225 | Conforming steel |
| p | 0.002 | 0.02 | 0.32 | 0.015 | 0.0080 | 0.026 | 0.0019 | — | — | Ti: 0.027, Ni: 0.305 | Conforming steel |
| q | 0.032 | 0.04 | 0.35 | 0.013 | 0.0070 | 0.033 | 0.0032 | 0.0120 | — | Mo: 0.10 | Conforming steel |
| r | 0.002 | 0.02 | 0.19 | 0.012 | 0.0120 | 0.045 | 0.0023 | — | — | Ti: 0.044, W: 0.015 | Conforming steel |
| s | 0.019 | 0.01 | 0.25 | 0.017 | 0.0065 | 0.034 | 0.0033 | 0.0060 | — | Ta: 0.007 | Conforming steel |
| t | 0.001 | 0.03 | 0.28 | 0.055 | 0.0065 | 0.018 | 0.0026 | — | — | Ti: 0.030, Pb: 0.0040 | Conforming steel |
| u | 0.025 | 0.05 | 0.42 | 0.012 | 0.0060 | 0.035 | 0.0031 | — | — | Bi: 0.0017 | Conforming steel |
| v | 0.086 | 0.28 | 2.12 | 0.019 | 0.0018 | 0.030 | 0.0034 | 0.0060 | — | Se: 0.0110 | Conforming steel |
| w | 0.052 | 0.04 | 0.21 | 0.021 | 0.0070 | 0.052 | 0.0035 | — | — | Te: 0.0120 | Conforming steel |
| x | 0.002 | 0.02 | 0.36 | 0.065 | 0.0075 | 0.034 | 0.0032 | — | 0.0070 | Ge: 0.0110 | Conforming steel |
| y | 0.075 | 0.42 | 1.74 | 0.011 | 0.0025 | 0.029 | 0.0036 | — | — | As: 0.0100 | Conforming steel |
| z | 0.018 | 0.02 | 0.55 | 0.021 | 0.0075 | 0.034 | 0.0029 | — | — | Sr: 0.0070 | Conforming steel |
| aa | 0.065 | 0.19 | 1.98 | 0.017 | 0.0020 | 0.031 | 0.0036 | 0.0100 | — | Cs: 0.0090 | Conforming steel |
| ab | 0.016 | 0.02 | 0.34 | 0.011 | 0.0065 | 0.050 | 0.0032 | — | — | Zn: 0.008 | Conforming steel |
| ac | 0.002 | 0.03 | 0.12 | 0.012 | 0.0045 | 0.037 | 0.0022 | — | — | Ti: 0.038, Co: 0.009 | Conforming steel |
| ad | 0.023 | 0.03 | 0.61 | 0.015 | 0.0080 | 0.033 | 0.0030 | 0.0080 | — | Ca: 0.0018 | Conforming steel |

TABLE 1-2-continued

| | | | | | | | | | | | |
|---|---|---|---|---|---|---|---|---|---|---|---|
| | | | | | | Cladding metal | | | | | |

| Steel | Chemical composition (mass %) | | | | | | | | | | |
|---|---|---|---|---|---|---|---|---|---|---|---|
| sample ID | C | Si | Mn | P | S | Al | N | Sb | Sn | Other | Remarks |
| ae | 0.017 | 0.02 | 0.23 | 0.019 | 0.0006 | 0.048 | 0.0031 | — | — | Ce: 0.0011 | Conforming steel |
| af | 0.001 | 0.02 | 0.25 | 0.018 | 0.0090 | 0.042 | 0.0020 | — | 0.0040 | Ti: 0.022, Mg: 0.0043 | Conforming steel |
| ag | 0.089 | 0.28 | 2.40 | 0.008 | 0.0010 | 0.037 | 0.0041 | 0.0050 | — | Zr: 0.0035 | Conforming steel |
| ah | 0.032 | 0.05 | 0.38 | 0.011 | 0.0062 | 0.044 | 0.0033 | — | — | Hf: 0.0045 | Conforming steel |
| ai | 0.001 | 0.02 | 0.38 | 0.015 | 0.0080 | 0.039 | 0.0026 | — | 0.0030 | Ti: 0.025, REM: 0.0022 | Conforming steel |
| aj | 0.009 | 0.03 | 0.25 | 0.013 | 0.0068 | 0.043 | 0.0030 | — | — | Zr: 0.0024 | Conforming steel |

"—" indicates content at inevitable impurity level.

TABLE 2

| | Surface treatment process and stacking process | | | | | Joining process | Hot rolling process | | Cold rolling process | Annealing process | | |
|---|---|---|---|---|---|---|---|---|---|---|---|---|
| | (1) Cladding metal (front side) | (2) Base metal | (3) Cladding metal (back side) | Cladding thickness ratio (1):(2):(3) | Surface roughness Ra (μm) | Degree of vacuum (Torr) | Slab heating temp. (° C.) | Rolling finish temp. (° C.) | Rolling reduction (%) | Annealing temp. (° C.) | Holding time (s) | |
| No. | | | | | | | | | | | | Remarks |
| 1 | b | A | b | 1:5:1 | 9.8 | $5.2 \times 10^{-5}$ | 1100 | 900 | 63.2 | 820 | 150 | Example |
| 2 | b | B | b | 1:12:1 | 10.8 | $9.2 \times 10^{-6}$ | 1250 | 890 | 65.0 | 800 | 200 | Example |
| 3 | b | C | b | 1:5:1 | 12.8 | $1.8 \times 10^{-5}$ | 1250 | 880 | 58.8 | 830 | 180 | Example |
| 4 | b | D | b | 1:10:1 | 10.2 | $5.3 \times 10^{-4}$ | 1250 | 900 | 66.7 | 860 | 240 | Example |
| 5 | b | E | b | 1:12:1 | 13.8 | $4.2 \times 10^{-5}$ | 1200 | 900 | 65.0 | 850 | 100 | Example |
| 6 | b | F | b | 1:5:1 | 8.4 | $3.8 \times 10^{-5}$ | 1150 | 880 | 63.2 | 880 | 220 | Example |
| 7 | b | G | b | 1:10:1 | 5.4 | $2.9 \times 10^{-4}$ | 1200 | 850 | 66.7 | 900 | 160 | Example |
| 8 | b | H | b | 1:10:2 | 6.5 | $5.8 \times 10^{-4}$ | 1100 | 890 | 70.0 | 870 | 160 | Example |
| 9 | b | I | b | 1:5:1 | 10.3 | $6.2 \times 10^{-5}$ | 1300 | 900 | 61.1 | 880 | 120 | Example |
| 10 | b | J | b | 1:10:1 | 16.5 | $1.6 \times 10^{-5}$ | 1100 | 870 | 70.0 | 870 | 200 | Example |
| 11 | b | K | b | 1:5:1 | 21.1 | $0.8 \times 10^{-3}$ | 1250 | 870 | 61.1 | 860 | 200 | Comparative Example |
| 12 | b | L | b | 1:5:1 | 14.5 | $2.3 \times 10^{-5}$ | 1150 | 850 | 65.0 | 810 | 180 | Comparative Example |
| 13 | b | M | b | 1:5:1 | 12.1 | $7.9 \times 10^{-3}$ | 1200 | 880 | 58.8 | 900 | 250 | Comparative Example |
| 14 | b | N | b | 1:12:1 | 10.4 | $8.8 \times 10^{-4}$ | 1150 | 880 | 65.0 | 850 | 150 | Example |
| 15 | b | O | b | 1:5:1 | 10.1 | $2.8 \times 10^{-5}$ | 1200 | 900 | 58.8 | 880 | 200 | Example |
| 16 | b | P | b | 1:5:1 | 9.5 | $6.6 \times 10^{-5}$ | 1100 | 910 | 58.8 | 870 | 180 | Example |
| 17 | b | Q | b | 1:12:1 | 10.4 | $1.8 \times 10^{-4}$ | 1150 | 870 | 65.0 | 820 | 250 | Example |
| 18 | b | R | b | 1:5:1 | 11.3 | $0.7 \times 10^{-3}$ | 1200 | 930 | 58.8 | 880 | 200 | Example |
| 19 | b | S | b | 1:10:1 | 20.1 | $3.6 \times 10^{-5}$ | 1250 | 880 | 53.8 | 780 | 200 | Example |
| 20 | b | T | b | 1:12:1 | 12.7 | $9.5 \times 10^{-6}$ | 1200 | 900 | 63.2 | 800 | 230 | Example |
| 21 | b | U | b | 1:12:1 | 8.7 | $9.4 \times 10^{-5}$ | 1150 | 910 | 58.8 | 820 | 400 | Example |
| 22 | b | V | b | 1:12:1 | 10.6 | $4.7 \times 10^{-5}$ | 1100 | 890 | 61.1 | 800 | 250 | Example |
| 23 | b | W | b | 1:5:1 | 9.4 | $2.6 \times 10^{-5}$ | 1300 | 880 | 65.0 | 850 | 100 | Example |
| 24 | b | X | b | 1:10:1 | 10.1 | $1.1 \times 10^{-4}$ | 1250 | 900 | 60.0 | 860 | 250 | Example |
| 25 | b | Y | b | 1:5:1 | 11.2 | $6.8 \times 10^{-6}$ | 1200 | 870 | 58.8 | 790 | 80 | Example |
| 26 | b | Z | b | 1:12:1 | 10.6 | $1.5 \times 10^{-3}$ | 1150 | 920 | 58.8 | 900 | 250 | Example |
| 27 | b | AA | b | 1:10:1 | 5.3 | $2.9 \times 10^{-3}$ | 1150 | 910 | 64.7 | 870 | 150 | Example |
| 28 | b | AB | b | 1:12:1 | 7.8 | $3.3 \times 10^{-5}$ | 1150 | 880 | 46.2 | 900 | 200 | Example |
| 29 | b | AC | b | 1:12:1 | 9.1 | $1.9 \times 10^{-5}$ | 1200 | 870 | 56.3 | 930 | 150 | Example |
| 30 | b | AD | b | 1:10:1 | 10.2 | $7.9 \times 10^{-4}$ | 1100 | 890 | 66.7 | 890 | 300 | Example |
| 31 | b | AE | b | 1:5:1 | 11.3 | $2.5 \times 10^{-5}$ | 1250 | 910 | 58.8 | 840 | 200 | Example |
| 32 | b | AF | b | 1:5:1 | 20.1 | $3.7 \times 10^{-5}$ | 1250 | 910 | 56.3 | 900 | 250 | Example |
| 33 | b | AG | b | 1:10:1 | 12.6 | $8.7 \times 10^{-5}$ | 1150 | 880 | 70.0 | 940 | 350 | Example |
| 34 | b | AH | b | 1:5:1 | 8.5 | $0.8 \times 10^{-3}$ | 1300 | 890 | 50.0 | 900 | 200 | Example |
| 35 | b | AI | b | 1:12:1 | 10.4 | $5.2 \times 10^{-5}$ | 1200 | 890 | 46.2 | 910 | 100 | Example |
| 36 | b | AJ | b | 1:5:1 | 6.4 | $9.2 \times 10^{-6}$ | 1250 | 870 | 58.8 | 890 | 200 | Example |
| 37 | b | AK | b | 1:5:1 | 7.9 | $1.3 \times 10^{-5}$ | 1100 | 910 | 65.0 | 900 | 120 | Example |
| 38 | b | AL | b | 1:10:1 | 9.3 | $1.2 \times 10^{-4}$ | 1200 | 890 | 64.7 | 850 | 600 | Example |
| 39 | b | AM | b | 1:5:1 | 10.5 | $9.7 \times 10^{-6}$ | 1250 | 920 | 50.0 | 820 | 180 | Example |
| 40 | b | AN | b | 1:12:1 | 13.1 | $6.3 \times 10^{-4}$ | 1250 | 880 | 46.2 | 780 | 300 | Example |
| 41 | d | B | d | 1:5:1 | 8.8 | $2.2 \times 10^{-4}$ | 1200 | 900 | 58.8 | 800 | 100 | Example |
| 42 | d | C | d | 1:5:1 | 9.4 | $5.3 \times 10^{-4}$ | 1300 | 910 | 58.8 | 820 | 150 | Example |
| 43 | d | G | d | 1:10:1 | 7.8 | $4.7 \times 10^{-5}$ | 1200 | 860 | 66.7 | 860 | 220 | Example |

TABLE 2-continued

| No. | First reheating process | | | Coating or plating process | | Second reheating process | | | Dehydrogenation treatment process | | Remarks |
| | Cooling | | | | | Cooling | | | | | |
| | stop temp. (°C) | Reheating temp. (°C) | Holding time (s) | Type * | Alloying temp. (°C) | stop temp. (°C) | Reheating temp. (°C) | Holding time (s) | Treatment temp. (°C) | Holding time (h) | |
| --- | --- | --- | --- | --- | --- | --- | --- | --- | --- | --- | --- |
| 1 | 200 | 400 | 60 | GA | 490 | | | | 90 | 12 | Example |
| 2 | 480 | | | GA | 520 | 210 | 400 | 50 | | | Example |
| 3 | 200 | 350 | 80 | GA | 490 | | | | 80 | 24 | Example |
| 4 | 480 | | | GA | 510 | 200 | 430 | 100 | | | Example |
| 5 | 500 | | | GA | 510 | 150 | 300 | 80 | | | Example |
| 6 | 520 | | | GA | 520 | | | | 90 | 6 | Example |
| 7 | 220 | 380 | 50 | GA | 500 | | | | 80 | 14 | Example |
| 8 | 500 | | | GA | 510 | 180 | 350 | 50 | | | Example |
| 9 | 480 | | | GA | 500 | 200 | 320 | 90 | | | Example |
| 10 | 510 | | | GA | 530 | 160 | 330 | 80 | | | Example |
| 11 | 190 | 400 | 40 | GA | 520 | | | | | | Comparative Example |
| 12 | 210 | 410 | 50 | GA | 540 | | | | | | Comparative Example |
| 13 | 500 | | | GA | 530 | | | | | | Comparative Example |
| 14 | 490 | | | GI | | 180 | 300 | 100 | | | Example |
| 15 | | | | CR | | | | | | | Example |
| 16 | | | | EG | | | | | 80 | 6 | Example |
| 17 | | 400 | 50 | CR | | | | | | | Example |
| 18 | 140 | 350 | 40 | GI | | | | | 120 | 5 | Example |
| 19 | | | | EG | | | | | | | Example |
| 20 | 500 | | | GI | | 210 | 320 | 80 | | | Example |
| 21 | | | | CR | | | | | | | Example |
| 22 | 120 | 320 | 60 | GA | 530 | | | | 90 | 10 | Example |
| 23 | 480 | | | GI | | 230 | 350 | 50 | | | Example |
| 24 | | | | EG | | | | | 100 | 12 | Example |
| 25 | 200 | 400 | 120 | GA | 500 | | | | | | Example |
| 26 | | | | CR | | | | | | | Example |
| 27 | 500 | | | GA | 540 | 150 | 350 | 120 | | | Example |
| 28 | 480 | | | GI | | 180 | 300 | 200 | | | Example |
| 29 | | | | EG | | | | | 90 | 7 | Example |
| 30 | 100 | 330 | 80 | GA | 490 | | | | 100 | 3 | Example |
| 31 | | | | CR | | | | | | | Example |
| 32 | 500 | | | GA | 530 | | | | | | Example |
| 33 | 520 | | | GI | | | | | 100 | 10 | Example |
| 34 | | | | EG | | | | | | | Example |
| 35 | 480 | | | GA | 500 | | | | 80 | 12 | Example |
| 36 | | | | CR | | | | | | | Example |
| 37 | 490 | | | GA | 550 | 200 | 360 | 90 | | | Example |
| 38 | 220 | 400 | 50 | GI | | | | | 90 | 10 | Example |
| 39 | | | | EG | | | | | 100 | 6 | Example |
| 40 | 510 | | | GA | 520 | 190 | 350 | 60 | | | Example |
| 41 | 490 | | | GA | 510 | 210 | 300 | 120 | | | Example |
| 42 | 480 | | | GA | 490 | 170 | 310 | 80 | | | Example |
| 43 | 470 | | | GA | 520 | 220 | 330 | 100 | | | Example |

| No. | Surface treatment process and stacking process | | | | | Joining process | Hot rolling process | | Cold rolling | Annealing process | | Remarks |
| | (1) | | (3) | | | | Slab | process | | | | |
| | Cladding | 2) | Cladding | Cladding | Surface | | | | | | | |
| | metal (front side) | Base metal | metal (back side) | thickness ratio (1):(2):(3) | roughness Ra (um) | Degree of vacuum (Torr) | heating temp. (°C) | finish temp. (°C) | Rolling reduction (%) | Annealing temp. (°C) | Holding time (s) | |
| --- | --- | --- | --- | --- | --- | --- | --- | --- | --- | --- | --- | --- |
| 44 | d | I | d | 1:5:1 | 4.6 | $3.6 \times 10^{-5}$ | 1250 | 930 | 63.2 | 910 | 80 | Example |
| 45 | | I | | | | | 1200 | 920 | 65.0 | 880 | 180 | Comparative Example |
| 46 | d | I | d | 1:5:1 | 11.1 | $4.4 \times 10^{-3}$ | 850 | 840 | 63.2 | 900 | 230 | Comparative Example |
| 47 | d | I | d | 1:5:1 | 8.9 | $2.7 \times 10^{-4}$ | 1250 | 650 | 63.2 | 880 | 250 | Comparative Example |
| 48 | d | I | d | 1:5:1 | 9.6 | $1.5 \times 10^{-3}$ | 1100 | 910 | 22.2 | 860 | 180 | Comparative Example |
| 49 | d | I | d | 1:5:1 | 14.1 | $6.5 \times 10^{-4}$ | 1200 | 870 | 63.2 | 630 | 200 | Comparative Example |
| 50 | d | I | d | 1:5:1 | 13.6 | $3.2 \times 10^{-3}$ | 1250 | 890 | 63.2 | 890 | 5 | Comparative Example |
| 51 | d | J | d | 1:5:1 | 9.5 | $1.8 \times 10^{-3}$ | 1150 | 930 | 58.8 | 900 | 200 | Example |
| 52 | a | I | a | 1:10:1 | 12.7 | $5.6 \times 10^{-4}$ | 1100 | 900 | 71.4 | 870 | 240 | Example |
| 53 | c | I | c | 1:12:1 | 8.7 | $3.8 \times 10^{-3}$ | 1250 | 880 | 56.3 | 860 | 120 | Example |
| 54 | e | I | e | 1:5:1 | 10.6 | $0.7 \times 10^{-6}$ | 1200 | 890 | 56.3 | 920 | 250 | Example |
| 55 | f | I | f | 1:10:1 | 10.5 | $3.6 \times 10^{-4}$ | 1300 | 900 | 64.7 | 900 | 150 | Example |

TABLE 2-continued

| No. | | | | | | | | | | | | Remarks |
|---|---|---|---|---|---|---|---|---|---|---|---|---|
| 56 | g | I | g | 1:5:1 | 8.3 | $1.2 \times 10^{-3}$ | 1200 | 880 | 61.1 | 860 | 200 | Comparative Example |
| 57 | h | I | h | 1:5:1 | 9.6 | $8.1 \times 10^{-4}$ | 1100 | 870 | 56.3 | 860 | 150 | Comparative Example |
| 58 | i | I | i | 1:5:1 | 12.1 | $5.3 \times 10^{-4}$ | 1150 | 900 | 50.0 | 880 | 300 | Comparative Example |
| 59 | j | I | j | 1:10:1 | 14.3 | $1.4 \times 10^{-3}$ | 1300 | 920 | 62.5 | 880 | 200 | Example |
| 60 | k | I | k | 1:12:1 | 17.4 | $0.9 \times 10^{-6}$ | 1150 | 880 | 61.1 | 900 | 150 | Example |
| 61 | l | I | l | 1:5:1 | 8.4 | $1.2 \times 10^{-4}$ | 1100 | 910 | 65.0 | 860 | 180 | Example |
| 62 | m | I | m | 1:12:1 | 5.4 | $2.3 \times 10^{-5}$ | 1250 | 900 | 61.1 | 840 | 190 | Example |
| 63 | n | I | n | 1:10:1 | 6.5 | $1.8 \times 10^{-4}$ | 1150 | 880 | 62.5 | 910 | 220 | Example |
| 64 | o | I | o | 1:12:1 | 7.6 | $8.7 \times 10^{-3}$ | 1200 | 890 | 65.0 | 870 | 250 | Example |
| 65 | p | I | p | 1:5:1 | 11.2 | $2.2 \times 10^{-3}$ | 1300 | 930 | 56.3 | 840 | 100 | Example |
| 66 | q | I | q | 1:10:1 | 15.8 | $6.9 \times 10^{-4}$ | 1250 | 880 | 66.7 | 880 | 150 | Example |
| 67 | r | I | r | 1:5:1 | 13.6 | $3.5 \times 10^{-3}$ | 1100 | 900 | 65.0 | 900 | 80 | Example |
| 68 | s | I | s | 1:12:1 | 6.8 | $1.6 \times 10^{-3}$ | 1250 | 900 | 56.3 | 870 | 200 | Example |
| 69 | t | I | t | 1:10:1 | 9.4 | $7.5 \times 10^{-3}$ | 1200 | 870 | 66.7 | 930 | 130 | Example |
| 70 | u | I | u | 1:5:1 | 7.1 | $4.5 \times 10^{-5}$ | 1150 | 890 | 66.7 | 910 | 240 | Example |
| 71 | v | I | v | 1:12:1 | 4.8 | $6.3 \times 10^{-4}$ | 1100 | 880 | 56.3 | 840 | 200 | Example |
| 72 | w | I | w | 1:10:1 | 13.3 | $9.1 \times 10^{-5}$ | 1150 | 910 | 62.5 | 860 | 400 | Example |
| 73 | x | I | x | 1:5:1 | 17.6 | $1.5 \times 10^{-5}$ | 1200 | 880 | 63.2 | 890 | 320 | Example |
| 74 | y | I | y | 1:5:1 | 12.1 | $2.6 \times 10^{-4}$ | 1250 | 930 | 56.3 | 930 | 180 | Example |
| 75 | z | I | z | 1:12:1 | 18.2 | $2.9 \times 10^{-5}$ | 1300 | 870 | 58.8 | 900 | 150 | Example |
| 76 | aa | I | aa | 1:10:1 | 12.4 | $0.7 \times 10^{-4}$ | 1200 | 890 | 66.7 | 850 | 120 | Example |
| 77 | ab | T | ab | 1:12:1 | 11.3 | $8.4 \times 10^{-5}$ | 1250 | 920 | 56.3 | 860 | 200 | Example |
| 78 | ac | T | ac | 1:5:1 | 8.7 | $4.2 \times 10^{-5}$ | 1100 | 870 | 50.0 | 870 | 120 | Example |
| 79 | ad | I | ad | 1:12:1 | 10.6 | $1.6 \times 10^{-3}$ | 1200 | 880 | 56.3 | 890 | 140 | Example |
| 80 | ae | T | ae | 1:10:1 | 9.4 | $8.9 \times 10^{-5}$ | 1150 | 890 | 66.7 | 860 | 180 | Example |
| 81 | af | I | af | 1:12:1 | 10.4 | $6.6 \times 10^{-4}$ | 1200 | 900 | 65.0 | 840 | 80 | Example |
| 82 | ag | I | ag | 1:5:1 | 29.1 | $7.7 \times 10^{-3}$ | 1250 | 880 | 61.1 | 900 | 200 | Example |
| 83 | ah | I | ah | 1:5:1 | 8.5 | $2.5 \times 10^{-3}$ | 1300 | 890 | 56.3 | 880 | 150 | Example |
| 84 | ai | I | ai | 1:10:1 | 7.3 | $3.9 \times 10^{-4}$ | 1200 | 910 | 70.0 | 850 | 180 | Example |
| 85 | aj | I | aj | 1:12:1 | 9.8 | $5.7 \times 10^{-3}$ | 1250 | 880 | 56.3 | 890 | 120 | Example |
| 86 | e | B | e | 1:12:1 | 70.5 | $3.1 \times 10^{-4}$ | 1150 | 900 | 58.8 | 880 | 300 | Comparative Example |

| | First reheating process | | | Coating or plating process | | Second reheating process | | | Dehydrogenation treatment process | | |
| | Cooling | | | | | Cooling | | | | | |
| No. | stop temp. (° C.) | Reheating temp. (° C.) | Holding time (s) | Type * | Alloying temp. (° C.) | stop temp. (° C.) | Reheating temp. (° C.) | Holding time (s) | Treatment temp. (° C.) | Holding time (h) | Remarks |
|---|---|---|---|---|---|---|---|---|---|---|---|
| 44 | 520 | | | GA | 500 | 200 | 300 | 40 | | | Example |
| 45 | | | | GA | 520 | 210 | 420 | 200 | | | Comparative Example |
| 46 | 500 | | | GA | 530 | 170 | 340 | 80 | | | Comparative Example |
| 47 | 510 | | | GA | 490 | 190 | 350 | 100 | | | Comparative Example |
| 48 | 520 | | | GA | 510 | 200 | 300 | 90 | | | Comparative Example |
| 49 | 490 | | | GA | 490 | 180 | 330 | 80 | | | Comparative Example |
| 50 | 500 | | | GA | 510 | 220 | 350 | 60 | | | Comparative Example |
| 51 | 480 | | | GA | 530 | 200 | 400 | 30 | | | Example |
| 52 | 490 | | | GA | 490 | | | | 100 | 8 | Example |
| 53 | 510 | | | GA | 510 | | | | 90 | 14 | Example |
| 54 | 510 | | | GA | 480 | | | | 100 | 12 | Example |
| 55 | 500 | | | GA | 500 | | | | 110 | 5 | Example |
| 56 | 400 | | | GA | 510 | 190 | 300 | 100 | | | Comparative Example |
| 57 | 170 | 290 | 90 | GA | 490 | | | | 90 | 15 | Comparative Example |
| 58 | 210 | 350 | 200 | GA | 520 | | | | 250 | 2 | Comparative Example |
| 59 | 520 | | | GA | 500 | 200 | 380 | 80 | | | Example |
| 60 | | | | CR | | | | | | | Example |
| 61 | 490 | | | GA | 490 | 190 | 300 | 60 | | | Example |
| 62 | 500 | | | GI | | | | | 70 | 30 | Example |
| 63 | | | | EG | | | | | 90 | 10 | Example |
| 64 | 150 | 410 | 40 | GA | 500 | | | | 100 | 8 | Example |
| 65 | | | | CR | | | | | | | Example |
| 66 | 200 | 400 | 30 | GA | 490 | | | | 80 | 24 | Example |
| 67 | 500 | | | GI | | 210 | 380 | 80 | | | Example |
| 68 | | | | EG | | | | | | | Example |
| 69 | 480 | | | GA | 500 | 200 | 400 | 60 | | | Example |
| 70 | | | | CR | | | | | | | Example |
| 71 | 200 | 400 | 450 | GA | 510 | | | | | | Example |
| 72 | 500 | | | GI | | 170 | 350 | 100 | | | Example |
| 73 | | | | EG | | | | | | | Example |
| 74 | 180 | 390 | 60 | GA | 490 | | | | | | Example |
| 75 | | | | CR | | | | | | | Example |
| 76 | 500 | | | GA | 510 | 180 | 300 | 60 | | | Example |
| 77 | 170 | 410 | 100 | GI | | | | | 100 | 12 | Example |
| 78 | | | | EG | | | | | | | Example |
| 79 | 400 | | | GA | 490 | 200 | 400 | 90 | | | Example |

TABLE 2-continued

| | | | | | | | | | | | | |
|---|---|---|---|---|---|---|---|---|---|---|---|---|
| 80 | | | | CR | | | | | | | | Example |
| 81 | 490 | | | GA | 500 | 180 | 360 | 50 | | | | Example |
| 82 | 500 | | | GI | | | | | | 70 | 15 | Example |
| 83 | | | | EG | | 200 | 360 | 100 | | | | Example |
| 84 | 180 | 420 | 60 | GA | 510 | | | | | 100 | 8 | Example |
| 85 | 490 | | | GI | | 190 | 350 | 50 | | | | Example |
| 86 | 500 | | | GA | 500 | 200 | 350 | 60 | | | | Comparative Example |

\* CR: cold-rolled steel sheet (uncoated), GI: hot-dip galvanized steel sheet, GA: galvannealed steel sheet, EG: electrogalvanized steel sheet

TABLE 3

| | Type of clad steel plate | | | | | Base metal B and TM | | | | Cladding metal | | | |
|---|---|---|---|---|---|---|---|---|---|---|---|---|---|
| No. | (1) Cladding metal (front side) | (2) Base metal | (3) Cladding metal (back side) | Cladding thickness ratio (1):(2):(3) | Sheet thickness (mm) | total area ratio (%) | RA volume fraction (%) | Residual micro-structure | HVB | F area ratio (%) | Residual micro-structure | HVL | Remarks |
| 1 | b | A | b | 1:5:1 | 1.4 | 50 | 12 | F, M, θ | 324 | 99 | θ | 92 | Example |
| 2 | b | B | b | 1:12:1 | 1.4 | 52 | 13 | F, M, θ | 315 | 99 | θ | 96 | Example |
| 3 | b | C | b | 1:5:1 | 1.4 | 68 | 10 | F, M, θ | 380 | 99 | θ | 87 | Example |
| 4 | b | D | b | 1:10:1 | 1.2 | 65 | 8 | F, M, θ | 370 | 99 | θ | 96 | Example |
| 5 | b | E | b | 1:12:1 | 1.4 | 72 | 10 | F, M, θ | 421 | 99 | θ | 95 | Example |
| 6 | b | F | b | 1:5:1 | 1.4 | 79 | 9 | F, M, θ | 459 | 99 | θ | 103 | Example |
| 7 | b | G | b | 1:10:1 | 1.2 | 78 | 11 | F, M, θ | 460 | 99 | θ | 97 | Example |
| 8 | b | H | b | 1:10:2 | 1.2 | 80 | 13 | F, M, θ | 454 | 99 | θ | 86 | Example |
| 9 | b | I | b | 1:5:1 | 1.4 | 78 | 14 | F, M, θ | 565 | 99 | θ | 87 | Example |
| 10 | b | J | b | 1:10:1 | 1.2 | 80 | 10 | F, M, θ | 681 | 99 | θ | 90 | Example |
| 11 | b | K | b | 1:5:1 | 1.4 | 20 | 0 | F, M, θ | 223 | 11 | θ | 89 | Comparative Example |
| 12 | b | L | b | 1:5:1 | 1.4 | 80 | 9 | F, M, θ | 458 | 15 | θ | 92 | Comparative Example |
| 13 | b | M | b | 1:5:1 | 1.4 | 24 | 2 | F, M, P, θ | 214 | 48 | θ | 95 | Comparative Example |
| 14 | b | N | b | 1:12:1 | 1.4 | 51 | 13 | F, M, θ | 307 | 99 | θ | 93 | Example |
| 15 | b | O | b | 1:5:1 | 1.4 | 80 | 10 | F, M, θ | 462 | 99 | θ | 96 | Example |
| 16 | b | P | b | 1:5:1 | 1.4 | 83 | 14 | F, M, θ | 560 | 99 | θ | 92 | Example |
| 17 | b | Q | b | 1:12:1 | 1.4 | 69 | 11 | F, M, θ | 378 | 99 | θ | 94 | Example |
| 18 | b | R | b | 1:5:1 | 1.4 | 82 | 9 | F, M, θ | 461 | 99 | θ | 89 | Example |
| 19 | b | S | b | 1:10:1 | 1.2 | 51 | 16 | F, M, θ | 305 | 99 | θ | 88 | Example |
| 20 | b | T | b | 1:12:1 | 1.4 | 53 | 14 | F, M, θ | 311 | 99 | θ | 97 | Example |
| 21 | b | U | b | 1:12:1 | 1.4 | 70 | 11 | F, M, θ | 367 | 99 | θ | 96 | Example |
| 22 | b | V | b | 1:12:1 | 1.4 | 69 | 14 | F, M, P, θ | 373 | 99 | θ | 105 | Example |
| 23 | b | W | b | 1:5:1 | 1.4 | 71 | 17 | F, M, θ | 375 | 99 | θ | 98 | Example |
| 24 | b | X | b | 1:10:1 | 1.2 | 73 | 11 | F, M, θ | 370 | 99 | θ | 95 | Example |
| 25 | b | Y | b | 1:5:1 | 1.4 | 68 | 12 | F, M, θ | 369 | 99 | θ | 93 | Example |
| 26 | b | Z | b | 1:12:1 | 1.4 | 79 | 14 | F, M, θ | 458 | 99 | θ | 105 | Example |
| 27 | b | AA | b | 1:10:1 | 1.2 | 78 | 10 | F, M, P, θ | 456 | 99 | θ | 98 | Example |
| 28 | b | AB | b | 1:12:1 | 1.4 | 80 | 12 | F, M, θ | 462 | 99 | θ | 86 | Example |
| 29 | b | AC | b | 1:12:1 | 1.4 | 77 | 14 | F, M, θ | 462 | 99 | θ | 90 | Example |
| 30 | b | AD | b | 1:10:1 | 1.2 | 78 | 10 | F, M, θ | 463 | 99 | θ | 90 | Example |
| 31 | b | AF | b | 1:5:1 | 1.4 | 80 | 12 | F, M, θ | 576 | 99 | θ | 89 | Example |
| 32 | b | AF | b | 1:5:1 | 1.4 | 78 | 9 | F, M, P, θ | 561 | 99 | θ | 87 | Example |
| 33 | b | AG | b | 1:10:1 | 1.2 | 81 | 7 | F, M, θ | 566 | 99 | θ | 88 | Example |
| 34 | b | AH | b | 1:5:1 | 1.4 | 80 | 14 | F, M, θ | 560 | 99 | θ | 98 | Example |
| 35 | b | AI | b | 1:12:1 | 1.4 | 80 | 16 | F, M, θ | 564 | 99 | θ | 99 | Example |
| 36 | b | AJ | b | 1:5:1 | 1.4 | 85 | 9 | F, M, θ | 686 | 99 | θ | 90 | Example |
| 37 | b | AK | b | 1:5:1 | 1.4 | 82 | 10 | F, M, P, θ | 685 | 99 | θ | 85 | Example |
| 38 | b | AL | b | 1:10:1 | 1.2 | 80 | 11 | F, M, θ | 682 | 99 | θ | 98 | Example |
| 39 | b | AM | b | 1:5:1 | 1.4 | 81 | 9 | F, M, θ | 687 | 99 | θ | 61 | Example |
| 40 | b | AN | b | 1:12:1 | 1.4 | 79 | 10 | F, M, θ | 691 | 99 | θ | 88 | Example |
| 41 | d | B | d | 1:5:1 | 1.4 | 51 | 11 | F, M, θ | 309 | 91 | M, B, θ | 187 | Example |
| 42 | d | C | d | 1:5:1 | 1.4 | 66 | 9 | F, M, θ | 370 | 92 | M, B, θ | 19 | Example |
| 43 | d | G | d | 1:10:1 | 1.2 | 71 | 16 | F, M, P, θ | 462 | 91 | M, B, P, θ | 187 | Example |

TABLE 3-continued

| | Clad steel plate | | | | Tensile test | | | | |
|---|---|---|---|---|---|---|---|---|---|
| No. | Amount of diffusible hydrogen (mass ppm) | HVL/ HVB | Boundary crack between base metal and cladding metal | Boundary roughness Ry (μm) | No. of voids at boundary between base metal and cladding metal (Number/ 10 mm) | TS (MPa) | El (%) | Local-deform ability- $(\varepsilon_w + \varepsilon_t)$ | V bend R/t | Remarks |
| 1 | 0.08 | 0.29 | No | 17.1 | 4 | 843 | 21.2 | 1.8 | 0.00 | Example |
| 2 | 0.03 | 0.30 | No | 14.7 | 3 | 927 | 19.5 | 1.6 | 0.00 | Example |
| 3 | 0.07 | 0.23 | No | 17.9 | 9 | 967 | 18.6 | 1.6 | 0.18 | Example |
| 4 | 0.09 | 0.26 | No | 24.5 | 6 | 1061 | 18.1 | 1.5 | 0.00 | Example |
| 5 | 0.12 | 0.23 | No | 12.5 | 5 | 1223 | 13.2 | 1.2 | 0.18 | Example |
| 6 | 0.07 | 0.22 | No | 9.8 | 1 | 1167 | 16.6 | 1.3 | 0.18 | Example |
| 7 | 0.05 | 0.21 | No | 8.7 | 9 | 1305 | 12.9 | 1.1 | 0.42 | Example |
| 8 | 0.06 | 0.19 | No | 13.4 | 6 | 1328 | 12.4 | 1.1 | 0.42 | Example |
| 9 | 0.08 | 0.15 | No | 19.5 | 4 | 1399 | 12.1 | 1.0 | 0.36 | Example |
| 10 | 0.02 | 0.13 | No | 17.5 | 8 | 1903 | 12.9 | 0.4 | 0.63 | Example |
| 11 | 0.26 | 0.40 | No | 30.3 | 9 | 604 | 15.5 | 2.1 | 0.00 | Comparative Example |
| 12 | 0.30 | 0.20 | Yes | 62.1 | 35 | 1154 | 13.9 | 0.1 | 5.36 | Comparative Example |
| 13 | 0.31 | 0.44 | No | 20.2 | 12 | 589 | 21.3 | 2.1 | 0.00 | Comparative Example |
| 14 | 0.11 | 0.30 | No | 17.9 | 12 | 902 | 20.0 | 1.7 | 0.00 | Example |
| 15 | 0.01 | 0.21 | No | 20.5 | 9 | 1167 | 17.2 | 1.3 | 0.36 | Example |
| 16 | 0.23 | 0.16 | No | 20.5 | 5 | 1393 | 12.0 | 1.0 | 0.54 | Example |
| 17 | 0.06 | 0.25 | No | 19.5 | 8 | 1102 | 17.6 | 1.4 | 0.18 | Example |
| 18 | 0.10 | 0.19 | No | 15.8 | 6 | 1158 | 17.1 | 1.3 | 0.54 | Example |
| 19 | 0.25 | 0.29 | No | 13.8 | 7 | 877 | 20.8 | 1.7 | 0.00 | Example |
| 20 | 0.09 | 0.31 | No | 19.4 | 7 | 915 | 17.9 | 1.7 | 0.00 | Example |
| 21 | 0.01 | 0.26 | No | 27.3 | 9 | 1073 | 18.5 | 1.4 | 0.18 | Example |
| 22 | 0.32 | 0.28 | No | 17.1 | 3 | 1095 | 17.8 | 1.4 | 0.18 | Example |
| 23 | 0.03 | 0.26 | No | 28.4 | 6 | 966 | 18.9 | 1.6 | 0.18 | Example |
| 24 | 0.05 | 0.26 | No | 25.6 | 3 | 1060 | 17.8 | 1.5 | 0.00 | Example |
| 25 | 0.27 | 0.25 | No | 21.9 | 8 | 949 | 19.4 | 1.6 | 0.18 | Example |
| 26 | 0.01 | 0.23 | No | 11.3 | 7 | 1330 | 12.7 | 1.1 | 0.36 | Example |
| 27 | 0.02 | 0.22 | No | 24.1 | 9 | 1293 | 12.4 | 1.1 | 0.42 | Example |
| 28 | 0.08 | 0.19 | No | 20.1 | 10 | 1334 | 13.0 | 1.1 | 0.36 | Example |
| 29 | 0.04 | 0.19 | No | 29.8 | 8 | 1335 | 12.1 | 1.1 | 0.36 | Example |
| 30 | 0.05 | 0.19 | No | 23.4 | 11 | 1309 | 12.8 | 1.1 | 0.42 | Example |
| 31 | 0.01 | 0.16 | No | 12.5 | 2 | 1428 | 12.8 | 0.9 | 0.54 | Example |
| 32 | 0.02 | 0.15 | No | 9.8 | 5 | 1391 | 13.5 | 1.0 | 0.36 | Example |
| 33 | 0.07 | 0.16 | No | 10.6 | 3 | 1590 | 12.6 | 0.7 | 0.63 | Example |
| 34 | 0.29 | 0.18 | No | 21.6 | 5 | 1398 | 13.3 | 1.0 | 0.36 | Example |
| 35 | 0.04 | 0.18 | No | 18.4 | 4 | 1626 | 13.9 | 0.7 | 0.54 | Example |
| 36 | 0.02 | 0.13 | No | 15.6 | 10 | 1684 | 12.8 | 0.6 | 0.36 | Example |
| 37 | 0.06 | 0.12 | No | 15.2 | 3 | 1678 | 12.7 | 0.6 | 0.36 | Example |
| 38 | 0.03 | 0.14 | No | 21.6 | 6 | 1910 | 12.9 | 0.5 | 0.63 | Example |
| 39 | 0.05 | 0.09 | No | 11.8 | 9 | 1660 | 12.5 | 0.6 | 0.36 | Example |
| 40 | 0.08 | 0.13 | No | 24.7 | 12 | 1975 | 12.3 | 0.5 | 0.71 | Example |
| 41 | 0.03 | 0.61 | No | 8.9 | 5 | 896 | 21.0 | 1.7 | 0.00 | Example |
| 42 | 0.02 | 0.52 | No | 12.8 | 7 | 1043 | 19.2 | 1.5 | 0.18 | Example |
| 43 | 0.04 | 0.40 | No | 18.4 | 5 | 1360 | 12.3 | 1.0 | 0.42 | Example |

| | VDA bending | | | | V-bend-orthogonal VDA bend | | | | | | |
|---|---|---|---|---|---|---|---|---|---|---|---|
| No. | $\alpha_{VDA}$ (°) | Max. load, F (N) | Stroke to max. load, S (mm) | F × S (N · mm) | Bend and crush properties | Max. load, F (N) | Stroke to max. load, S (mm) | F × S (N · mm) | Axial crush prop- erties | LME resis- tance | Type * | Remarks |
| 1 | 120 | 9127 | 13.1 | 119561 | ○ | 6926 | 32.3 | 223719 | ○ | ○ | GA | Example |
| 2 | 122 | 9557 | 13.3 | 127109 | ○ | 7190 | 31.7 | 227918 | ○ | ○ | GA | Example |
| 3 | 122 | 9305 | 13.1 | 121893 | ○ | 7557 | 31.3 | 236544 | ○ | ○ | GA | Example |
| 4 | 121 | 8666 | 12.8 | 110929 | ○ | 8009 | 31.2 | 249880 | ○ | ○ | GA | Example |
| 5 | 121 | 12837 | 12.7 | 163028 | ○ | 8582 | 30.9 | 265177 | ○ | ○ | GA | Example |
| 6 | 120 | 11523 | 12.7 | 146342 | ○ | 8078 | 31.2 | 252031 | ○ | ○ | GA | Example |
| 7 | 119 | 11711 | 12.4 | 145217 | ○ | 9091 | 30.5 | 277260 | ○ | ○ | GA | Example |
| 8 | 121 | 12007 | 12.3 | 147681 | ○ | 9296 | 30.8 | 286315 | ○ | ○ | GA | Example |
| 9 | 119 | 14091 | 12.3 | 173317 | ○ | 9912 | 30.0 | 297354 | ○ | ○ | GA | Example |
| 10 | 118 | 19187 | 11.1 | 205297 | ○ | 9941 | 29.8 | 296251 | ○ | ○ | GA | Example |
| 11 | 120 | 5286 | 11.5 | 60791 | x | 3245 | 27.8 | 90211 | x | ○ | GA | Comparative Example |
| 12 | 51 | 3457 | 6.9 | 23853 | x | 2579 | 24.9 | 64217 | x | x | GA | Comparative Example |
| 13 | 123 | 5112 | 12.0 | 61346 | x | 3328 | 27.9 | 92851 | x | ○ | GA | Comparative Example |
| 14 | 122 | 9288 | 13.8 | 128176 | ○ | 6969 | 32.0 | 223010 | ○ | ○ | GI | Example |

TABLE 3-continued

| No. | | | | | | | | | | | | |
|---|---|---|---|---|---|---|---|---|---|---|---|---|
| 15 | 119 | 11520 | 12.8 | 147454 | ○ | 9375 | 30.5 | 285948 | ○ | ○ | CR | Example |
| 16 | 119 | 14020 | 12.4 | 173843 | ○ | 9856 | 30.1 | 296666 | ○ | ○ | EG | Example |
| 17 | 120 | 11503 | 12.8 | 147240 | ○ | 8787 | 30.8 | 270642 | ○ | ○ | CR | Example |
| 18 | 119 | 11417 | 12.9 | 147279 | ○ | 9291 | 29.8 | 276869 | ○ | ○ | GI | Example |
| 19 | 120 | 9175 | 14.1 | 129367 | ○ | 6741 | 31.9 | 215037 | ○ | ○ | EG | Example |
| 20 | 121 | 9429 | 13.4 | 126348 | ○ | 7085 | 32.5 | 230251 | ○ | ○ | GI | Example |
| 21 | 119 | 11179 | 13.3 | 148678 | ○ | 8521 | 31.8 | 270964 | ○ | ○ | CR | Example |
| 22 | 119 | 11416 | 13.3 | 151834 | ○ | 8716 | 31.6 | 275415 | ○ | ○ | GA | Example |
| 23 | 120 | 9297 | 12.9 | 119930 | ○ | 7551 | 32.5 | 245402 | ○ | ○ | GI | Example |
| 24 | 120 | 8656 | 12.6 | 109065 | ○ | 8401 | 31.8 | 267165 | ○ | ○ | EG | Example |
| 25 | 119 | 9107 | 13.3 | 121124 | ○ | 7395 | 32.1 | 237380 | ○ | ○ | GA | Example |
| 26 | 118 | 14027 | 12.3 | 172528 | ○ | 9313 | 30.2 | 281249 | ○ | ○ | CR | Example |
| 27 | 119 | 11570 | 12.4 | 143462 | ○ | 8992 | 30.0 | 269764 | ○ | ○ | GA | Example |
| 28 | 120 | 14071 | 12.5 | 175887 | ○ | 9348 | 29.5 | 275754 | ○ | ○ | GI | Example |
| 29 | 121 | 14074 | 12.3 | 173112 | ○ | 9350 | 29.6 | 276762 | ○ | ○ | EG | Example |
| 30 | 119 | 11763 | 12.3 | 144686 | ○ | 9127 | 30.2 | 275626 | ○ | ○ | GA | Example |
| 31 | 120 | 14406 | 11.6 | 167105 | ○ | 10159 | 30.5 | 309836 | ○ | ○ | CR | Example |
| 32 | 120 | 14001 | 12.6 | 176408 | ○ | 9841 | 30.5 | 300154 | ○ | ○ | GA | Example |
| 33 | 119 | 15272 | 12.2 | 186318 | ○ | 7656 | 29.8 | 228145 | ○ | ○ | GI | Example |
| 34 | 118 | 14078 | 12.4 | 174569 | ○ | 9902 | 30.1 | 298047 | ○ | ○ | EG | Example |
| 35 | 119 | 17302 | 11.5 | 198969 | ○ | 7920 | 29.6 | 234418 | ○ | ○ | GA | Example |
| 36 | 120 | 17249 | 11.0 | 189736 | ○ | 8345 | 29.4 | 245357 | ○ | ○ | CR | Example |
| 37 | 117 | 17181 | 11.6 | 199296 | ○ | 8301 | 29.9 | 248191 | ○ | ○ | GA | Example |
| 38 | 118 | 19268 | 11.0 | 211946 | ○ | 9989 | 29.6 | 295665 | ○ | ○ | GI | Example |
| 39 | 119 | 16980 | 11.3 | 191872 | ○ | 8168 | 29.5 | 240969 | ○ | ○ | EG | Example |
| 40 | 116 | 21167 | 11.0 | 232835 | ○ | 10464 | 29.4 | 307634 | ○ | ○ | GA | Example |
| 41 | 123 | 8512 | 14.1 | 120021 | ○ | 6907 | 32.1 | 221706 | ○ | ○ | GA | Example |
| 42 | 121 | 10140 | 13.6 | 137906 | ○ | 8243 | 31.5 | 259654 | ○ | ○ | GA | Example |
| 43 | 121 | 12402 | 12.8 | 158746 | ○ | 9571 | 30.5 | 291909 | ○ | ○ | GA | Example |

| No. | Type of clad steel plate | | | | Sheet thickness (mm) | Base metal B and TM | | | | Cladding metal | | | Remarks |
|---|---|---|---|---|---|---|---|---|---|---|---|---|---|
| | (1) Cladding metal (front side) | (2) Base metal | (3) Cladding metal (back side) | Cladding thickness ratio (1):(2):(3) | | total area ratio (%) | RA volume fraction (%) | Residual micro-structure | HVB | F area ratio (%) | Residual micro-structure | HVL | |
| 44 | d | I | d | 1:5:1 | 1.4 | 80 | 15 | F, M, θ | 566 | 94 | M, B, θ | 193 | Example |
| 45 | | I | | | 1.4 | 85 | 7 | F, M, θ | 563 | | | | Comparative Example |
| 46 | d | I | d | 1:5:1 | 1.4 | 75 | 6 | F, M, θ | 558 | 95 | M, B, θ | 185 | Comparative Example |
| 47 | d | I | d | 1:5:1 | 1.4 | 72 | 7 | F, M, θ | 563 | 81 | F', M, B, θ | 188 | Comparative Example |
| 48 | d | I | d | 1:5:1 | 1.4 | 68 | 9 | F, M, θ | 568 | 65 | F', M, B, θ | 193 | Comparative Example |
| 49 | d | I | d | 1:5:1 | 1.4 | 29 | 3 | F, M, θ | 565 | 79 | F', M, B, θ | 188 | Comparative Example |
| 50 | d | I | d | 1:5:1 | 1.4 | 27 | 2 | F, M, θ | 560 | 76 | F', M, B, θ | 186 | Comparative Example |
| 51 | d | J | d | 1:5:1 | 1.4 | 82 | 12 | F, M, P, θ | 690 | 89 | M, B, P, θ | 196 | Example |
| 52 | a | I | a | 1:10:1 | 1.2 | 78 | 14 | F, M, θ | 565 | 97 | θ | 94 | Example |
| 53 | c | I | c | 1:12:1 | 1.4 | 79 | 10 | F, M, θ | 562 | 98 | θ | 150 | Example |
| 54 | e | I | e | 1:5:1 | 1.4 | 76 | 9 | F, M, θ | 564 | 91 | M, B, θ | 255 | Example |
| 55 | f | I | f | 1:10:1 | 1.2 | 79 | 12 | F, M, θ | 571 | 98 | θ | 151 | Example |
| 56 | g | I | g | 1:5:1 | 1.4 | 78 | 10 | F, M, θ | 569 | 69 | M, B, θ | 225 | Comparative Example |
| 57 | h | I | h | 1:5:1 | 1.4 | 80 | 9 | F, M, θ | 564 | 78 | M, B, θ | 209 | Comparative Example |
| 58 | i | I | i | 1:5:1 | 1.4 | 79 | 8 | F, M, θ | 562 | 82 | M, B, θ | 190 | Comparative Example |
| 59 | j | I | j | 1:10:1 | 1.2 | 80 | 12 | F, M, θ | 566 | 98 | θ | 114 | Example |
| 60 | k | I | k | 1:12:1 | 1.4 | 77 | 10 | F, M, θ | 568 | 96 | M, B, θ | 162 | Example |
| 61 | l | I | l | 1:5:1 | 1.4 | 78 | 14 | F, M, θ | 559 | 99 | θ | 95 | Example |
| 62 | m | I | m | 1:12:1 | 1.4 | 79 | 13 | F, M, θ | 562 | 95 | M, B, θ | 190 | Example |
| 63 | n | I | n | 1:10:1 | 1.2 | 76 | 10 | F, M, θ | 559 | 99 | θ | 92 | Example |
| 64 | o | I | o | 1:12:1 | 1.4 | 80 | 8 | F, M, θ | 563 | 98 | θ | 150 | Example |
| 65 | p | I | p | 1:5:1 | 1.4 | 81 | 9 | F, M, θ | 565 | 99 | θ | 90 | Example |
| 66 | q | I | q | 1:10:1 | 1.2 | 79 | 12 | F, M, θ | 568 | 99 | θ | 142 | Example |
| 67 | r | I | r | 1:5:1 | 1.4 | 78 | 10 | F, M, θ | 573 | 99 | θ | 97 | Example |
| 68 | S | I | s | 1:12:1 | 1.4 | 79 | 12 | F, M, θ | 568 | 97 | θ | 151 | Example |
| 69 | t | I | t | 1:10:1 | 1.2 | 80 | 15 | F, M, θ | 560 | 98 | θ | 95 | Example |
| 70 | u | I | u | 1:5:1 | 1.4 | 82 | 17 | F, M, θ | 561 | 99 | θ | 148 | Example |
| 71 | v | I | v | 1:12:1 | 1.4 | 76 | 11 | F, M, θ | 559 | 98 | θ | 189 | Example |
| 72 | w | I | w | 1:10:1 | 1.2 | 80 | 12 | F, M, θ | 562 | 98 | θ | 150 | Example |
| 73 | x | I | x | 1:5:1 | 1.4 | 78 | 14 | F, M, θ | 562 | 99 | θ | 101 | Example |

TABLE 3-continued

| 74 | y | I | y | 1:5:1 | 1.4 | 79 | 10 | F, M, θ | 559 | 96 | M, B, θ | 197 | Example |
|---|---|---|---|---|---|---|---|---|---|---|---|---|---|
| 75 | z | I | z | 1:12:1 | 1.4 | 81 | 12 | F, M, θ | 565 | 98 | θ | 149 | Example |
| 76 | aa | I | aa | 1:10:1 | 1.2 | 80 | 13 | F, M, θ | 566 | 95 | M, B, θ | 193 | Example |
| 77 | ab | I | ab | 1:12:1 | 1.4 | 79 | 10 | F, M, θ | 563 | 98 | θ | 153 | Example |
| 78 | ac | I | ac | 1:5:1 | 1.4 | 79 | 8 | F, M, θ | 562 | 99 | θ | 92 | Example |
| 79 | ad | I | ad | 1:12:1 | 1.4 | 80 | 14 | F, M, θ | 564 | 99 | θ | 150 | Example |
| 80 | ae | I | ae | 1:10:1 | 1.2 | 81 | 12 | F, M, θ | 567 | 98 | θ | 145 | Example |
| 81 | af | I | af | 1:12:1 | 1.4 | 78 | 10 | F, M, θ | 563 | 99 | θ | 94 | Example |
| 82 | ag | I | ag | 1:5:1 | 1.4 | 76 | 9 | F, M, θ | 572 | 91 | M, B, θ | 253 | Example |
| 83 | ah | I | ah | 1:5:1 | 1.4 | 81 | 10 | F, M, θ | 574 | 99 | θ | 144 | Example |
| 84 | ai | I | ai | 1:10:1 | 1.2 | 82 | 12 | F, M, θ | 566 | 97 | θ | 90 | Example |
| 85 | aj | I | aj | 1:12:1 | 1.4 | 80 | 14 | F, M, θ | 557 | 98 | θ | 144 | Example |
| 86 | e | B | e | 1:12:1 | 1.4 | 51 | 7 | F, M, θ | 326 | 65 | M, B, θ | 268 | Comparative Example |

| No. | Amount of diffusible hydrogen (mass ppm) | HVL/ HVB | Boundary crack between base metal and cladding metal | Boundary roughness Ry (μm) | No. of voids at boundary between base metal and cladding metal (Number/ 10 mm) | TS (MPa) | El (%) | Local deform-ability- $(\varepsilon_w + \varepsilon_t)$ | V bend R/t | Remarks |
|---|---|---|---|---|---|---|---|---|---|---|
| 44 | 0.05 | 0.34 | No | 19.3 | 3 | 1501 | 12.5 | 0.8 | 0.54 | Example |
| 45 | 0.02 | | | | | 1838 | 9.5 | 0.4 | 5.36 | Comparative Example |
| 46 | 0.05 | 0.33 | Yes | 68.1 | 31 | 1474 | 6.2 | 0.1 | 0.36 | Comparative Example |
| 47 | 0.01 | 0.33 | Yes | 62.4 | 28 | 908 | 7.3 | 0.3 | 0.36 | Comparative Example |
| 48 | 0.04 | 0.34 | Yes | 59.3 | 33 | 1505 | 6.5 | 0.1 | 0.54 | Comparative Example |
| 49 | 0.05 | 0.33 | No | 20.4 | 5 | 859 | 6.9 | 0.4 | 0.36 | Comparative Example |
| 50 | 0.03 | 0.33 | No | 27.8 | 8 | 878 | 7.2 | 0.3 | 0.36 | Comparative Example |
| 51 | 0.01 | 0.28 | No | 20.3 | 6 | 1794 | 13.2 | 0.4 | 0.71 | Example |
| 52 | 0.03 | 0.17 | No | 17.5 | 8 | 1589 | 13.8 | 0.7 | 0.42 | Example |
| 53 | 0.05 | 0.27 | No | 20.4 | 10 | 1644 | 12.4 | 0.6 | 0.36 | Example |
| 54 | 0.02 | 0.45 | No | 21.4 | 5 | 1553 | 12.6 | 0.8 | 0.54 | Example |
| 55 | 0.01 | 0.26 | No | 25.4 | 6 | 1635 | 13.2 | 0.7 | 0.42 | Example |
| 56 | 0.01 | 0.40 | No | 24.9 | 7 | 1538 | 5.9 | 0.1 | 2.14 | Comparative Example |
| 57 | 0.02 | 0.37 | No | 16.5 | 10 | 1511 | 11.2 | 0.8 | 1.79 | Comparative Example |
| 58 | 0.03 | 0.34 | No | 21.5 | 8 | 1488 | 6.8 | 0.1 | 1.43 | Comparative Example |
| 59 | 0.04 | 0.20 | No | 20.5 | 7 | 1602 | 13.2 | 0.7 | 0.21 | Example |
| 60 | 0.01 | 0.28 | No | 21.5 | 6 | 1665 | 12.8 | 0.6 | 0.54 | Example |
| 61 | 0.05 | 0.17 | No | 9.3 | 2 | 1392 | 13.6 | 1.0 | 0.18 | Example |
| 62 | 0.03 | 0.34 | No | 7.9 | 9 | 1661 | 12.5 | 0.6 | 0.36 | Example |
| 63 | 0.02 | 0.16 | No | 17.5 | 11 | 1573 | 13.9 | 0.7 | 0.00 | Example |
| 64 | 0.05 | 0.27 | No | 22.6 | 7 | 1646 | 13.0 | 0.6 | 0.36 | Example |
| 65 | 0.01 | 0.16 | No | 27.8 | 5 | 1403 | 13.7 | 1.0 | 0.00 | Example |
| 66 | 0.04 | 0.25 | No | 17.9 | 10 | 1622 | 12.9 | 0.7 | 0.21 | Example |
| 67 | 0.07 | 0.17 | No | 38.7 | 7 | 1428 | 13.8 | 0.9 | 0.00 | Example |
| 68 | 0.05 | 0.27 | No | 20.3 | 10 | 1660 | 12.7 | 0.6 | 0.54 | Example |
| 69 | 0.03 | 0.17 | No | 17.5 | 9 | 1576 | 13.5 | 0.7 | 0.21 | Example |
| 70 | 0.01 | 0.26 | No | 20.4 | 12 | 1448 | 12.6 | 0.9 | 0.36 | Example |
| 71 | 0.23 | 0.34 | No | 21.4 | 13 | 1654 | 12.3 | 0.6 | 0.36 | Example |
| 72 | 0.05 | 0.27 | No | 25.4 | 11 | 1611 | 12.5 | 0.7 | 0.21 | Example |
| 73 | 0.18 | 0.18 | No | 21.5 | 4 | 1406 | 13.6 | 1.0 | 0.00 | Example |
| 74 | 0.26 | 0.35 | No | 23.4 | 6 | 1489 | 12.3 | 0.9 | 0.18 | Example |
| 75 | 0.01 | 0.26 | No | 26.5 | 9 | 1651 | 12.9 | 0.6 | 0.18 | Example |
| 76 | 0.04 | 0.34 | No | 18.4 | 9 | 1646 | 13.1 | 0.6 | 0.42 | Example |
| 77 | 0.07 | 0.27 | No | 13.9 | 4 | 1649 | 13.7 | 0.6 | 0.00 | Example |
| 78 | 0.24 | 0.16 | No | 15.5 | 14 | 1398 | 13.5 | 1.0 | 0.36 | Example |
| 79 | 0.02 | 0.27 | No | 18.4 | 10 | 1650 | 12.8 | 0.6 | 0.18 | Example |
| 80 | 0.01 | 0.26 | No | 12.5 | 7 | 1622 | 12.5 | 0.7 | 0.21 | Example |
| 81 | 0.04 | 0.17 | No | 13.9 | 6 | 1621 | 13.7 | 0.7 | 0.00 | Example |
| 82 | 0.02 | 0.44 | No | 20.8 | 19 | 1570 | 12.5 | 0.7 | 0.54 | Example |
| 83 | 0.01 | 0.25 | No | 25.3 | 7 | 1473 | 13.0 | 0.9 | 0.36 | Example |
| 84 | 0.03 | 0.16 | No | 20.1 | 9 | 1591 | 13.8 | 0.7 | 0.00 | Example |
| 85 | 0.01 | 0.26 | No | 19.2 | 5 | 1627 | 12.7 | 0.7 | 0.18 | Example |
| 86 | 0.03 | 0.82 | Yes | 67.8 | 39 | 1039 | 12.2 | 0.3 | 4.29 | Comparative Example |

TABLE 3-continued

| No. | VDA bending | | | | | V-bend-orthogonal VDA bend | | | | | Type * | Remarks |
|---|---|---|---|---|---|---|---|---|---|---|---|---|
| | $\alpha_{VDA}$ (°) | Max. load, F (N) | Stroke to max. load, S (mm) | F × S (N · mm) | Bend and crush properties | Max. load, F (N) | Stroke to max. load, S (mm) | F × S (N · mm) | Axial crush prop- erties | LME resis- tance | | |
| 44 | 116 | 15214 | 12.4 | 188655 | ○ | 10792 | 30.8 | 332400 | ○ | ○ | GA | Example |
| 45 | 44 | 12355 | 4.5 | 55598 | x | 9465 | 27.9 | 264074 | x | x | GA | Comparative Example |
| 46 | 55 | 2945 | 5.2 | 15314 | x | 2103 | 23.9 | 50262 | x | ○ | GA | Comparative Example |
| 47 | 67 | 4215 | 6.5 | 27398 | x | 3527 | 24.5 | 86412 | x | ○ | GA | Comparative Example |
| 48 | 52 | 2879 | 5.7 | 16410 | x | 1977 | 25.1 | 49623 | x | ○ | GA | Comparative Example |
| 49 | 62 | 3678 | 6.1 | 22436 | x | 2130 | 25.0 | 53250 | x | ○ | GA | Comparative Example |
| 50 | 66 | 3784 | 6.2 | 23461 | x | 2470 | 24.8 | 61256 | x | ○ | GA | Comparative Example |
| 51 | 120 | 18458 | 11.5 | 212261 | ○ | 9141 | 29.1 | 266007 | ○ | ○ | GA | Example |
| 52 | 119 | 15259 | 12.9 | 196847 | ○ | 11557 | 29.8 | 344401 | ○ | ○ | GA | Example |
| 53 | 122 | 17506 | 12.6 | 220573 | ○ | 8054 | 30.0 | 241617 | ○ | ○ | GA | Example |
| 54 | 122 | 15796 | 13.0 | 205352 | ○ | 11249 | 29.7 | 334081 | ○ | ○ | GA | Example |
| 55 | 121 | 15840 | 11.5 | 182161 | ○ | 11961 | 29.6 | 354037 | ○ | ○ | GA | Example |
| 56 | 48 | 2947 | 4.6 | 13556 | x | 1895 | 24.9 | 47186 | x | ○ | GA | Comparative Example |
| 57 | 92 | 15323 | 9.8 | 150168 | x | 7078 | 30.3 | 214465 | ○ | x | GA | Comparative Example |
| 58 | 55 | 3044 | 5.6 | 17046 | x | 2027 | 25.8 | 52297 | x | x | GA | Comparative Example |
| 59 | 120 | 15424 | 12.0 | 185086 | ○ | 7745 | 29.5 | 228465 | ○ | ○ | GA | Example |
| 60 | 121 | 17729 | 11.8 | 209201 | ○ | 8201 | 29.0 | 237821 | ○ | ○ | CR | Example |
| 61 | 119 | 14012 | 12.8 | 179350 | ○ | 9850 | 30.1 | 296479 | ○ | ○ | GA | Example |
| 62 | 118 | 17694 | 11.8 | 208790 | ○ | 12187 | 29.3 | 357085 | ○ | ○ | GI | Example |
| 63 | 119 | 15056 | 11.6 | 174644 | ○ | 11415 | 29.5 | 336751 | ○ | ○ | EG | Example |
| 64 | 118 | 17526 | 12.0 | 210316 | ○ | 12056 | 30.3 | 365290 | ○ | ○ | GA | Example |
| 65 | 119 | 14130 | 13.1 | 185107 | ○ | 9943 | 30.1 | 299278 | ○ | ○ | CR | Example |
| 66 | 118 | 15676 | 12.4 | 194379 | ○ | 11846 | 29.5 | 349469 | ○ | ○ | GA | Example |
| 67 | 118 | 14409 | 13.2 | 190196 | ○ | 10161 | 30.3 | 307880 | ○ | ○ | GI | Example |
| 68 | 119 | 17681 | 12.1 | 213945 | ○ | 8169 | 29.5 | 241000 | ○ | ○ | EG | Example |
| 69 | 118 | 15097 | 11.8 | 178146 | ○ | 7554 | 29.3 | 221327 | ○ | ○ | GA | Example |
| 70 | 118 | 14630 | 12.6 | 184342 | ○ | 10335 | 30.2 | 312106 | ○ | ○ | CR | Example |
| 71 | 119 | 17615 | 11.9 | 209618 | ○ | 8126 | 29.6 | 240522 | ○ | ○ | GA | Example |
| 72 | 117 | 15534 | 11.6 | 180196 | ○ | 7809 | 29.4 | 229584 | ○ | ○ | GI | Example |
| 73 | 119 | 14162 | 12.8 | 181273 | ○ | 9968 | 30.4 | 303015 | ○ | ○ | EG | Example |
| 74 | 120 | 15088 | 13.1 | 197647 | ○ | 10693 | 30.1 | 321859 | ○ | ○ | GA | Example |
| 75 | 120 | 17580 | 12.0 | 210962 | ○ | 8103 | 29.3 | 237413 | ○ | ○ | CR | Example |
| 76 | 119 | 15971 | 11.0 | 175683 | ○ | 8064 | 29.4 | 237085 | ○ | ○ | GA | Remarks |
| 77 | 120 | 17552 | 11.3 | 198334 | ○ | 8084 | 29.4 | 237672 | ○ | ○ | GI | Example |
| 78 | 120 | 14075 | 12.7 | 178752 | ○ | 9899 | 30.3 | 299952 | ○ | ○ | EG | Example |
| 79 | 119 | 17564 | 12.0 | 210772 | ○ | 8092 | 29.7 | 240345 | ○ | ○ | GA | Example |
| 80 | 118 | 15669 | 11.5 | 180199 | ○ | 7888 | 29.6 | 233483 | ○ | ○ | CR | Example |
| 81 | 119 | 17246 | 11.9 | 205231 | ○ | 7883 | 29.5 | 232551 | ○ | ○ | GA | Example |
| 82 | 118 | 15977 | 12.5 | 199709 | ○ | 7508 | 30.5 | 228999 | ○ | ○ | GI | Example |
| 83 | 116 | 14912 | 12.9 | 192364 | ○ | 10555 | 30.0 | 316661 | ○ | ○ | EG | Example |
| 84 | 118 | 15282 | 12.9 | 197142 | ○ | 7662 | 29.5 | 226028 | ○ | ○ | GA | Example |
| 85 | 119 | 17318 | 12.4 | 214737 | ○ | 7930 | 29.0 | 229969 | ○ | ○ | GI | Example |
| 86 | 56 | 4862 | 7.5 | 36465 | x | 3217 | 24.7 | 79460 | x | ○ | GA | Comparative Example |

F: ferrite, F': non-recrystallized ferrite, M: martensite, TM: tempered martensite, RA: residual austenite, B: bainite, P: pearlite, θ: cementite and other carbides

* CR: cold-rolled steel sheet, GI: hot-dip galvanized steel sheet, GA: galvannealed steel sheet, EG: electrogalvanized steel sheet As indicated in Table 3, the Examples have a tensile strength (TS) of 780 MPa or more and excellent ductility, bendability, collision resistance, and LME resistance. In contrast, the Comparative Examples are inferior to the Examples in at least one of these.

Further, the members obtained by a forming or joining process using the clad steel plates of the present disclosure were found to have tensile strength (TS) of 780 MPa or higher and excellent ductility, bendability, collision resistance, and LME resistance.

The invention claimed is:

1. A clad steel plate having a base metal and a cladding metal on front and back surfaces of the base metal, the base metal comprising a chemical composition containing, by mass %,
C: 0.080% or more and 0.350% or less,
Si: 0.50% or more and 2.00% or less,
Mn: 1.80% or more and less than 3.50%,
P: 0.001% or more and 0.100% or less,
S: 0.0200% or less,
Al: 0.010% or more and 2.000% or less,
N: 0.0100% or less, and
optionally at least one selected from the group consisting of
Sb: 0.200% or less,
Sn: 0.200% or less,
Ti: 0.200% or less,
Nb: 0.200% or less,
V: 0.100% or less,
B: 0.0100% or less,
Cu: 1.00% or less,
Cr: 1.000% or less,
Ni: 1.000% or less,
Mo: 0.50% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less,
with the balance being Fe and inevitable impurities; the steel microstructure comprising:
a total area ratio of bainite and tempered martensite: 30% or more, and
a volume fraction of retained austenite: more than 5%,
the cladding metal comprising a chemical composition containing, by mass %,
C: 0.100% or less,
Si: 0.60% or less,
Mn: 1.72% or more and 2.50% or less
P: 0.001% or more and 0.100% or less,
S: 0.0200% or less,
Al: 0.010% or more and 0.100% or less,
N: 0.0100% or less, and optionally at least one selected from the group consisting of
Sb: 0.200% or less,
Sn: 0.200% or less,
Ti: 0.200% or less,
Nb: 0.200% or less,
V: 0.100% or less,
B: 0.0100% or less,
Cu: 1.00% or less,
Cr: 1.000% or less,
Ni: 1.000% or less,
Mo: 0.50% or less,
Ta: 0.100% or less,
W: 0.500% or less,
Mg: 0.0200% or less,
Zn: 0.020% or less,
Co: 0.020% or less,
Zr: 0.020% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less,
with the balance being Fe and inevitable impurities; the steel microstructure comprising:
an area ratio of ferrite: 80% or more, wherein
average Vickers hardness (HVL) of the cladding metal is 260 or less,
the average Vickers hardness (HVL) of the cladding metal divided by average Vickers hardness (HVB) of the base metal is 0.80 or less,
boundary roughness between the base metal and the cladding metal is 50 μm or less at a maximum height Ry; and
a number of voids at a boundary between the base metal and the cladding metal is 20 or fewer per 10 mm of boundary length.

2. The clad steel plate of claim 1, wherein thickness of the base metal divided by total thickness of the cladding metal is 1 or more.

3. The clad steel plate of claim 2, wherein the clad steel plate satisfies at least one selected from following (a) and (b),
(a) the clad steel plate having a galvanized layer, a galvannealed layer, or an electrogalvanized layer on a surface, and
(b) a total diffusible hydrogen content in the base metal and the cladding metal being 0.50 mass ppm or less.

4. A member made using the clad steel plate of claim 3.

5. A member made using the clad steel plate of claim 2.

6. The clad steel plate of claim 1, wherein the clad steel plate satisfies at least one selected from following (a) and (b),
(a) the clad steel plate having a galvanized layer, a galvannealed layer, or an electrogalvanized layer on a surface, and
(b) a total diffusible hydrogen content in the base metal and the cladding metal being 0.50 mass ppm or less.

7. A member made using the clad steel plate of claim 6.

8. A member made using the clad steel plate of claim 1.

9. A method of producing a member, wherein the clad steel plate of claim 1 is subjected to at least one of a forming process and a joining process to make the member.

10. A method of producing the clad steel plate of claim 1, comprising:

a first preparation process of preparing a base metal steel slab comprising the chemical composition of the base metal of claim 1;

a second preparation process of preparing cladding metal steel slabs each comprising the chemical composition of the cladding metal of claim 1;

a surface treatment process of surface treating both front and back surfaces of the base metal steel slab and at least one of front and back surfaces of each of the cladding metal steel slabs to have a surface roughness Ra of 30 μm or less;

a stacking process of stacking the base metal steel slab and the cladding metal steel slabs in the order of one the cladding metal steel slabs—the base metal steel slab—one of the cladding metal steel slabs so that the surface treated surfaces of the base metal steel slab and the surface treated surfaces of the cladding metal steel slabs are in contact, to obtain a stacked slab;

a joining process of joining the cladding metal steel slabs and the base metal steel slab, and creating a vacuum of $1 \times 10^{-2}$ Torr or less between the cladding metal steel slabs and the base metal steel slab to obtain a joined stacked slab;

a hot rolling process of heating the joined stacked slab to a temperature range from 1,050° C. or more to 1,350° C. or less, then hot rolling under a set of conditions including a rolling finish temperature of 820° C. or more to obtain a hot-rolled steel sheet;

a cold rolling process of cold rolling the hot-rolled steel sheet under a set of conditions including a cold rolling reduction ratio of 30% or more to 80% or less to obtain a cold-rolled steel sheet; and an annealing process of annealing the cold-rolled steel sheet under a set of conditions including an annealing temperature of 750° C. or more and 950° C. or less and a holding time of 20 s or more.

11. The method of producing a clad steel plate of claim 10, further comprising a first reheating process after the annealing process, of cooling the cold-rolled steel sheet to a cooling stop temperature of 250° C. or less, then reheating to a temperature range from more than 250° C. to 450° C. or less and holding for 10 s or more.

12. The method of producing a clad steel plate of claim 11, wherein the method satisfies at least one selected from following (c) and (d), (c) the method further comprising a coating or plating process after the annealing process or after the first reheating process, of subjecting the cold-rolled steel sheet to a coating or plating treatment to obtain a coated or plated steel sheet, and (d) the method further comprising a coating or plating process after the annealing process or after the first reheating process, of subjecting the cold-rolled steel sheet to a coating or plating treatment to obtain a coated or plated steel sheet, the coating or plating treatment being a hot-dip galvanizing treatment, a galvannealing treatment, or an electrogalvanization treatment.

13. The method of producing a clad steel plate of claim 12, further comprising a dehydrogenation treatment process after the coating or plating treatment, of holding the coated or plated steel sheet at a temperature range from 50° C. or more to 300° C. or less for 0.5 h or more and 72.0 h or less.

14. The method of producing a clad steel plate of claim 10, wherein the method satisfies at least one selected from following (c) and (d), (c) the method further comprising a coating or plating process after the annealing process or after the first reheating process, of subjecting the cold-rolled steel sheet to a coating or plating treatment to obtain a coated or plated steel sheet, and (d) the method further comprising a coating or plating process after the annealing process or after the first reheating process, of subjecting the cold-rolled steel sheet to a coating or plating treatment to obtain a coated or plated steel sheet, the coating or plating treatment being a hot-dip galvanizing treatment, a galvannealing treatment, or an electrogalvanization treatment.

15. The method of producing a clad steel plate of claim 14, further comprising a dehydrogenation treatment process after the coating or plating treatment, of holding the coated or plated steel sheet at a temperature range from 50° C. or more to 300° C. or less for 0.5 h or more and 72.0 h or less.

16. The method of producing a clad steel plate of claim 10, further comprising:

a coating process after the annealing process, of subjecting the cold-rolled steel sheet to a hot-dip galvanizing treatment or a galvannealing treatment to obtain a coated steel sheet; and a second reheating process of cooling the coated steel sheet to a cooling stop temperature of 250° C. or less, then reheating to a temperature range from more than 250° C. to 450° C. or less and holding for 10 s or more.

17. The method of producing a clad steel plate of claim 16, further comprising a dehydrogenation treatment process after the second reheating process, of holding the coated steel sheet at a temperature range from 50° C. or more to 300° C. or less for 0.5 h or more and 72.0 h or less.

18. A method of producing a member, wherein the clad steel plate of claim 2 is subjected to at least one of a forming process and a joining process to make the member.

19. A method of producing a member, wherein the clad steel plate of claim 6 is subjected to at least one of a forming process and a joining process to make the member.

20. A method of producing a member, wherein the clad steel plate of claim 3 is subjected to at least one of a forming process and a joining process to make the member.

\* \* \* \* \*